(12) United States Patent
Aotake et al.

(10) Patent No.: US 11,561,303 B2
(45) Date of Patent: Jan. 24, 2023

(54) RANGING PROCESSING DEVICE, RANGING MODULE, RANGING PROCESSING METHOD, AND PROGRAM

(71) Applicant: Sony Semiconductor Solutions Corporation, Kanagawa (JP)

(72) Inventors: Shuntaro Aotake, Kanagawa (JP); Tomonori Masuno, Kanagawa (JP); Takuro Kamiya, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 1139 days.

(21) Appl. No.: 16/375,896

(22) Filed: Apr. 5, 2019

(65) Prior Publication Data

US 2020/0025924 A1    Jan. 23, 2020

(51) Int. Cl.
  *G01S 17/36* (2006.01)
  *G01S 7/48* (2006.01)
  (Continued)

(52) U.S. Cl.
  CPC ............ *G01S 17/36* (2013.01); *G01S 7/4808* (2013.01); *G01S 7/497* (2013.01); *G01S 17/32* (2013.01); *G01S 17/894* (2020.01)

(58) Field of Classification Search
  CPC ........ G01S 17/36; G01S 7/4808; G01S 7/497; G01S 17/32; G01S 17/894; G01S 7/4914;
  (Continued)

(56) References Cited

U.S. PATENT DOCUMENTS

| | | | |
|---|---|---|---|
| 7,362,419 B2 * | 4/2008 | Kurihara | G01S 7/4918 257/E27.151 |
| 8,254,638 B2 * | 8/2012 | Masuda | G01S 17/36 382/106 |

(Continued)

FOREIGN PATENT DOCUMENTS

| | | |
|---|---|---|
| CN | 106911888 A | 6/2017 |
| EP | 2 477 043 A1 | 7/2012 |

(Continued)

OTHER PUBLICATIONS

Extended European Search Report dated Sep. 27, 2019 in connection with European Application No. 19170343.8.

(Continued)

*Primary Examiner* — Seung C Sohn
(74) *Attorney, Agent, or Firm* — Wolf, Greenfield & Sacks, P.C.

(57) ABSTRACT

A ranging processing device includes: a four-phase ranging operation unit that performs an operation to calculate depth indicating a distance to an object by using all eight detection signals two of which are detected for each of irradiated light of first to fourth phases; a two-phase ranging operation unit that performs the operation to calculate the depth indicating the distance to the object by alternately using four detection signals based on the irradiated light of the first phase and the irradiated light of the second phase and four detection signals based on the irradiated light of the third phase and the irradiated light of the fourth phase among the eight detection signals; and a condition determination unit that makes condition determination based on the detection signals and switch between the four-phase ranging operation unit and the two-phase ranging operation unit to be used.

16 Claims, 28 Drawing Sheets

(51) Int. Cl.
*G01S 7/497* (2006.01)
*G01S 17/32* (2020.01)
*G01S 17/894* (2020.01)

(58) Field of Classification Search
CPC ........ G01S 7/4915; G01S 17/50; G01S 17/08; G01S 7/4913
See application file for complete search history.

(56) References Cited

U.S. PATENT DOCUMENTS

| | | | |
|---|---|---|---|
| 2012/0062705 | A1 | 3/2012 | Ovsiannikov |
| 2015/0334372 | A1 | 11/2015 | Kim et al. |
| 2019/0331776 | A1 | 10/2019 | Aotake et al. |

FOREIGN PATENT DOCUMENTS

| | | |
|---|---|---|
| JP | 2016050832 A | 4/2016 |
| JP | 2017032342 A | 2/2017 |
| JP | 2017-150893 A | 8/2017 |
| TW | 201637440 A | 10/2016 |
| WO | WO-2013026680 A1 | 2/2013 |

OTHER PUBLICATIONS

Schmidt et al., High frame rate for 3D Time-of-Flight cameras by dynamic sensor calibration. IEEE International Conference on Computational Photography (ICCP) Apr. 8, 2011:1-8.
U.S. Appl. No. 16/375,888, filed Apr. 5, 2019, Aotake et al.

\* cited by examiner

RANGING PROCESSING DEVICE, RANGING MODULE, RANGING PROCESSING METHOD, AND PROGRAM

CROSS REFERENCE TO RELATED APPLICATIONS

This application claims the benefit of Japanese Priority Patent Application JP 2018-087513 filed Apr. 27, 2018, the entire contents of which are incorporated herein by reference.

BACKGROUND

The present technology relates to a ranging processing device, a ranging module, a ranging processing method, and a program and, in particular, to a ranging processing device, a ranging module, a ranging processing method, and a program that allow higher performance.

In recent years, the miniaturization of ranging modules that measure distances to objects have been advanced with improvements in semiconductor technologies. Thus, the installation of ranging modules in mobile terminals such as so-called smart phones that are small information processing devices having communication functions have been, for example, realized.

In general, there are two types of ranging methods, Indirect ToF (Time-of-Flight) and Structured Light as ranging methods in ranging modules. According to the Indirect ToF method, light reflected by the surface of an object after being irradiated onto the object is detected, and a distance to the object is calculated on the basis of a measurement value obtained by measuring a flying time of the light. According to the Structured Light method, pattern light is irradiated onto an object, and a distance to the object is calculated on the basis of an image obtained by imaging distortion of a pattern on the surface of the object.

For example, Japanese Patent Application Laid-open No. 2017-150893 discloses a technology for determining the motion of an object within a detection period to accurately measure a distance in a ranging system that performs ranging according to the ToF method.

SUMMARY

Meanwhile, in order to use a ranging module in a mobile terminal as described above, it is desirably requested to improve the performance of a frame rate, consumption power, a data transfer band, or the like.

The present disclosure has been made in view of the above circumstances and allows higher performance.

An embodiment of the present disclosure provides a ranging processing device including: a four-phase ranging operation unit configured to perform, when charges generated by irradiating irradiated light of first to fourth phases onto an object and receiving reflected light reflected by the object are distributed to a first tap and a second tap according to a distance to the object, an operation to calculate depth indicating the distance to the object by using all eight detection signals two of which are detected for each of the irradiated light of the first to fourth phases; a two-phase ranging operation unit configured to perform the operation to calculate the depth indicating the distance to the object by alternately using four detection signals based on the irradiated light of the first phase and the irradiated light of the second phase and four detection signals based on the irradiated light of the third phase and the irradiated light of the fourth phase among the eight detection signals; and a condition determination unit configured to make condition determination based on the detection signals and switch between the four-phase ranging operation unit and the two-phase ranging operation unit to be used.

An embodiment of the present disclosure provides a ranging module including: a light emission unit configured to irradiate irradiated light of first to fourth phases onto an object; a light reception unit configured to output, when charges generated by receiving reflected light reflected by the object are distributed to a first tap and a second tap according to a distance to the object, eight detection signals two of which are detected for each of the irradiated light of the first to fourth phases; a four-phase ranging operation unit configured to perform an operation to calculate depth indicating the distance to the object by using all the eight detection signals; a two-phase ranging operation unit configured to perform an operation to calculate the depth indicating the distance to the object by alternately using four detection signals based on the irradiated light of the first phase and the irradiated light of the second phase and four detection signals based on the irradiated light of the third phase and the irradiated light of the fourth phase among the eight detection signals; and a condition determination unit configured to make condition determination based on the detection signals and switch between the four-phase ranging operation unit and the two-phase ranging operation unit.

An embodiment of the present disclosure provides a ranging processing method including: performing four-phase ranging operation processing for performing, when charges generated by irradiating irradiated light of first to fourth phases onto an object and receiving reflected light reflected by the object are distributed to a first tap and a second tap according to a distance to the object, an operation to calculate depth indicating the distance to the object by using all eight detection signals two of which are detected for each of the irradiated light of the first to fourth phases; performing two-phase ranging operation processing for performing the operation to calculate the depth indicating the distance to the object by alternately using four detection signals based on the irradiated light of the first phase and the irradiated light of the second phase and four detection signals based on the irradiated light of the third phase and the irradiated light of the fourth phase among the eight detection signals; and making condition determination based on the detection signals and switching between the four-phase ranging operation processing and the two-phase ranging operation processing to be used.

An embodiment of the present disclosure provides a program for causing a computer of a ranging processing device that performs ranging processing to perform the ranging processing, the ranging processing including: performing four-phase ranging operation processing for performing, when charges generated by irradiating irradiated light of first to fourth phases onto an object and receiving reflected light reflected by the object are distributed to a first tap and a second tap according to a distance to the object, an operation to calculate depth indicating the distance to the object by using all eight detection signals two of which are detected for each of the irradiated light of the first to fourth phases; performing two-phase ranging operation processing for performing the operation to calculate the depth indicating the distance to the object by alternately using four detection signals based on the irradiated light of the first phase and the irradiated light of the second phase and four detection signals based on the irradiated light of the third phase and the irradiated light of the fourth phase among the eight detection signals; and making condition determination based on the detection signals and switching between the four-phase ranging operation processing and the two-phase ranging operation processing to be used.

In an embodiment of the present disclosure, charges generated by irradiating irradiated light of first to fourth phases onto an object and receiving reflected light reflected by the object are distributed to a first tap and a second tap according to a distance to the object, and eight detection signals are detected for the irradiated light of the first to fourth phases (two of the eight detection signals are detected for each of the irradiated light). Then, four-phase ranging operation processing for performing an operation to calculate depth indicating a distance to the object is performed by using all the eight detection signals. Two-phase ranging operation processing for performing the operation to calculate the depth indicating the distance to the object is performed by alternately using four detection signals based on the irradiated light of the first phase and the irradiated light of the second phase and four detection signals based on the irradiated light of the third phase and the irradiated light of the fourth phase among the eight detection signals. Condition determination is made based on the detection signals, and the four-phase ranging operation processing and the two-phase ranging operation processing are switched to be used.

According to an embodiment of the present disclosure, it is possible to allow higher performance.

Note that the effects described here are not limitative and any of the effects described in the present disclosure may be produced.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, specific embodiments to which the present technology is applied will be described in detail with reference to the drawings.

(Configuration Example of Ranging Module)

Figure 1:
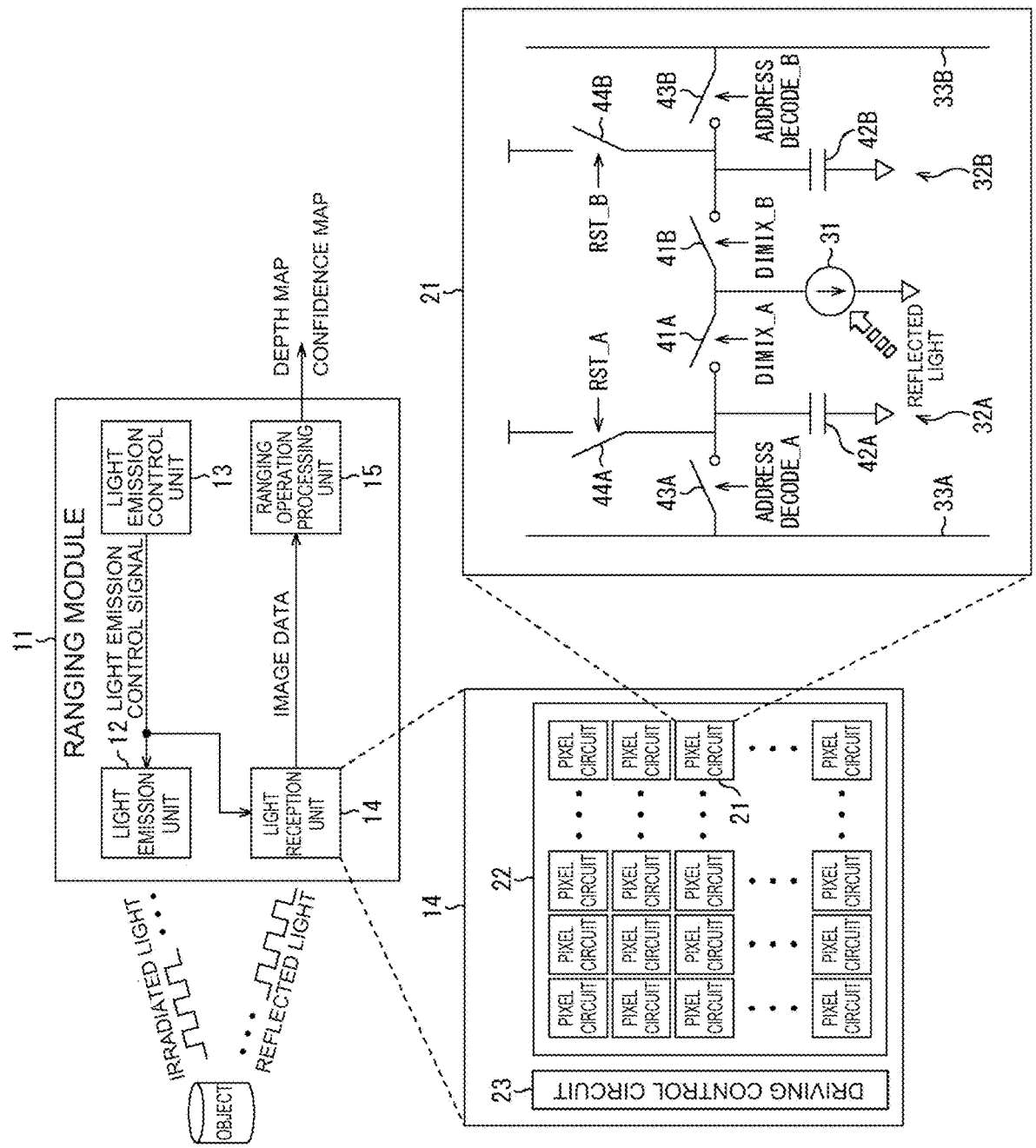
FIG. 1 is a block diagram showing a configuration example of an embodiment of a ranging module to which the present technology is applied.

FIG. 1 is a block diagram showing a configuration example of an embodiment of a ranging module to which the present technology is applied.

As shown in FIG. 1, a ranging module 11 includes a light emission unit 12, a light emission control unit 13, a light reception unit 14, and a ranging operation processing unit 15. For example, the ranging module 11 irradiates light onto an object and receives light (reflected light) generated when the light (irradiated light) is reflected by the object to measure a depth indicating a distance to the object.

The light emission unit 12 emits light while modulating the same at timing corresponding to a light emission control signal supplied from the light emission control unit 13 according to the control of the light emission control unit 13 and irradiates the irradiated light onto the object.

The light emission control unit 13 supplies a light emission control signal having a prescribed frequency (for example, 20 MHz or the like) to the light emission unit 12 to control the light emission of the light emission unit 12. Further, the light emission control unit 13 also supplies the light emission control signal to the light reception unit 14 to cause the light reception unit 14 to drive in conjunction with the timing of the light emission of the light emission unit 12.

The light reception unit 14 receives reflected light from an object on its sensor surface in which a plurality of pixels are arranged in an array form. Then, the light reception unit 14 supplies image data constituted by a detection signal corresponding to a light reception amount of the reflected light received by each of the pixels to the ranging operation processing unit 15.

The ranging operation unit 15 performs an operation to calculate a depth from the ranging module 11 to an object on the basis of image data supplied from the light reception unit 14. Then, the ranging operation processing unit 15 generates a depth map in which a depth to the object is expressed for each of pixels and a confidence map in which the confidence of each depth is expressed for each of the pixels, and outputs the generated maps to a subsequent control unit not shown (for example, an application processing unit 121 or an operation system processing unit 122 of FIG. 25, or the like). Note that the detailed configuration of the ranging operation processing unit 15 will be described later with reference to FIG. 12.

Further, in the light reception unit 14, a pixel array unit 22 in which a plurality of pixel circuits 22 are arranged in an array form is provided, and a driving control circuit 23 is arranged in a peripheral region of the pixel array unit 22. The pixel array unit 22 is a sensor surface that receives reflected light. The driving control circuit 23 outputs a control signal (for example, a distribution signal DIMIX, a selection signal ADDRESS DECODE, or a reset signal RST that will be described later) to control the driving of the pixel circuits 21 on the basis of, for example, a light emission control signal supplied from the light emission control unit 13, or the like.

The pixel circuits 21 are configured such that that charges generated by one photodiode 31 are distributed to a tap 32A and a tap 32B. Then, among the charges generated by the photodiode 31, charges distributed to the tap 32A are read out from a signal line 33A to be used as a detection signal A, while charges distributed to the tap 32B are read out from a signal line 33B to be used as a detection signal B.

The tap 32A is constituted by a transfer transistor 41A, a FD (Floating Diffusion) unit 42A, a selection transistor 43A, and a reset transistor 44A. Similarly, the tap 32B is constituted by a transfer transistor 41B, a FD unit 42B, a selection transistor 43B, and a reset transistor 44B.

The distribution of charges in the pixel circuits 21 will be described with reference to FIG. 2.

Figure 2:
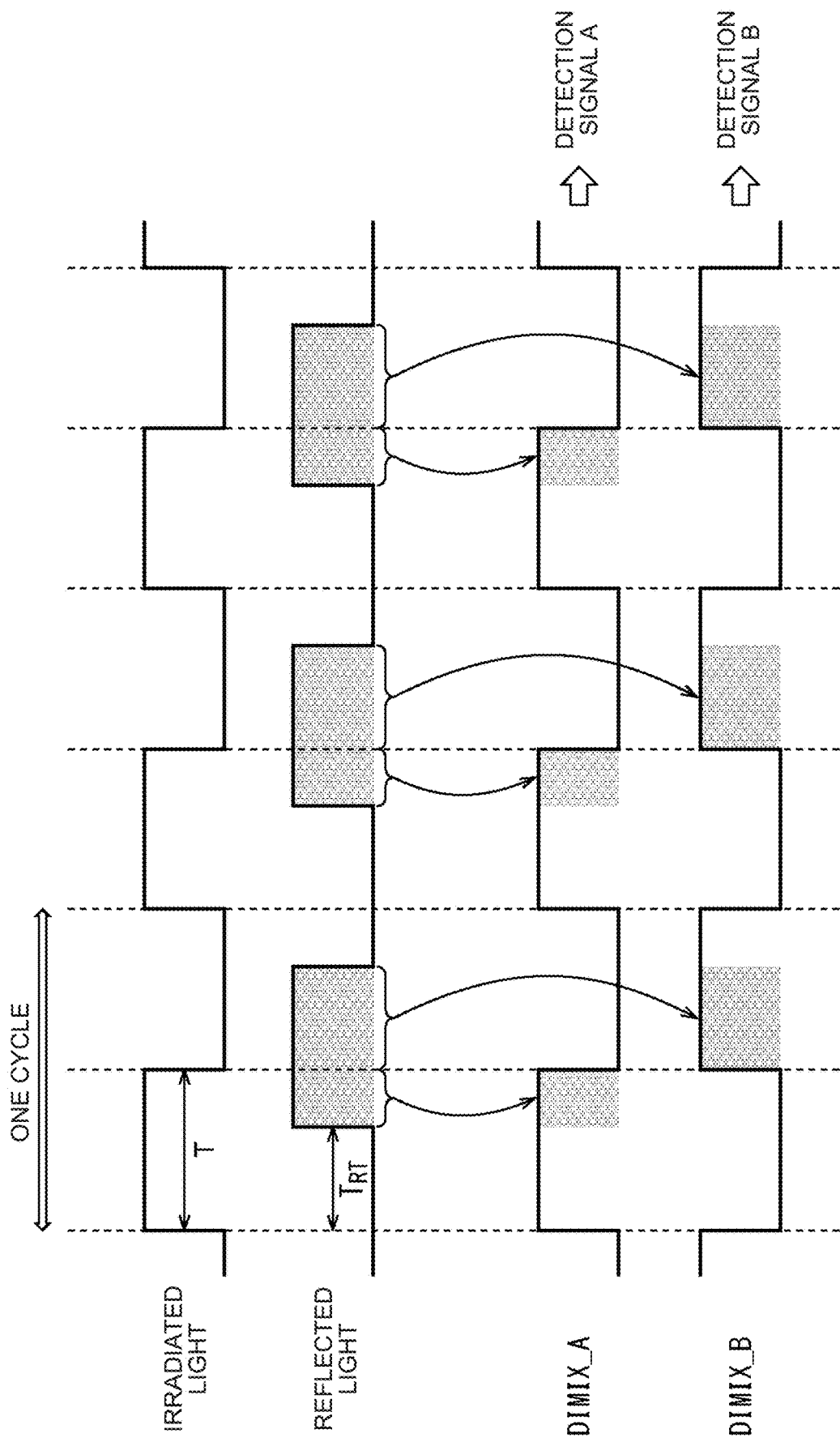
FIG. 2 is a diagram for describing the distribution of charges in a pixel circuit.

As shown in FIG. 2, irradiated light modulated (1 cycle=2 T) to repeatedly turn on and off irradiation at an irradiation time T is output from the light emission unit 12, and reflected light is received by the photodiode 31 so as to be delayed by a delay time $T_{RT}$ corresponding to a distance to an object. Further, a distribution signal DIMIX_A controls the turning on/off of the transfer transistor 41A, and a distribution signal DIMIX_B controls the turning on/off of the transfer transistor 41B. As shown in FIG. 2, the distribution signal DIMIX_A has the same phase as that of the irradiated light, while the distribution signal DIMIX_B has a phase obtained by inverting the phase of the distribution signal DIMIX_A.

Accordingly, charges generated when the photodiode 31 receives the reflected light are transferred to the FD unit 42A in a period in which the transfer transistor 41A is turned on according to the distribution signal DIMIX_A, and transferred to the FD unit 42B in a period in which the transfer transistor 41B is turned on according to the distribution signal DIMIX_B. Thus, in a prescribed period in which the irradiated light is periodically irradiated at the irradiation time T, charges transferred via the transfer transistor 41A are sequentially accumulated in the FD unit 42A, and charges transferred via the transfer transistor 41B are sequentially accumulated in the FD unit 42B.

Then, when the selection transistor 43A is turned on according to a selection signal ADDRESS DECODE_A after the end of the period in which the charges are accumulated, the charges accumulated in the FD unit 42A are read out via the signal line 33A and a detection signal A corresponding to an amount of the charges is output from the light reception unit 14. Similarly, when the selection transistor 43B is turned on according to a selection signal ADDRESS DECODE_B, the charges accumulated in the FD unit 42B are read out via the signal line 33B and a detection signal B corresponding to an amount of the charges is output from the light reception unit 14. Further, the charges accumulated in the FD unit 42A are discharged when the reset transistor 44A is turned on according to a reset signal RST_A, and the charges accumulated in the FD unit 42B are discharged when the reset transistor 44B is turned on according to a reset signal RST_B.

As described above, the pixel circuits 21 may distribute the charges generated by the reflected light received by the photodiode 31 to the taps 32A and 32B according to the delay time $T_{RT}$ and output the detection signals A and B. Further, the delay time $T_{RT}$ corresponds to a time from the emission of the light from the light emission unit 12 to an object to the return of the light to the light reception unit 14 after being reflected by the object, i.e., a distance to the object. Accordingly, the ranging module 11 is allowed to calculate the distance (depth) to the object according to the delay time $T_{RT}$ on the basis of the detection signals A and B.

Meanwhile, in the ranging module 11, different influence is exerted upon the detection signals A and B for each of the pixel circuits 21 due to a difference in the characteristics between photodiodes 31 of the individual pixel circuits 21. Accordingly, by the irradiated light of different phases, an operation to cancel the influence due to the difference in the characteristics is generally performed a plurality of times on the basis of the detection signals A and B detected from the reflected light generated from the irradiated light of the respective phases.

Figure 3:
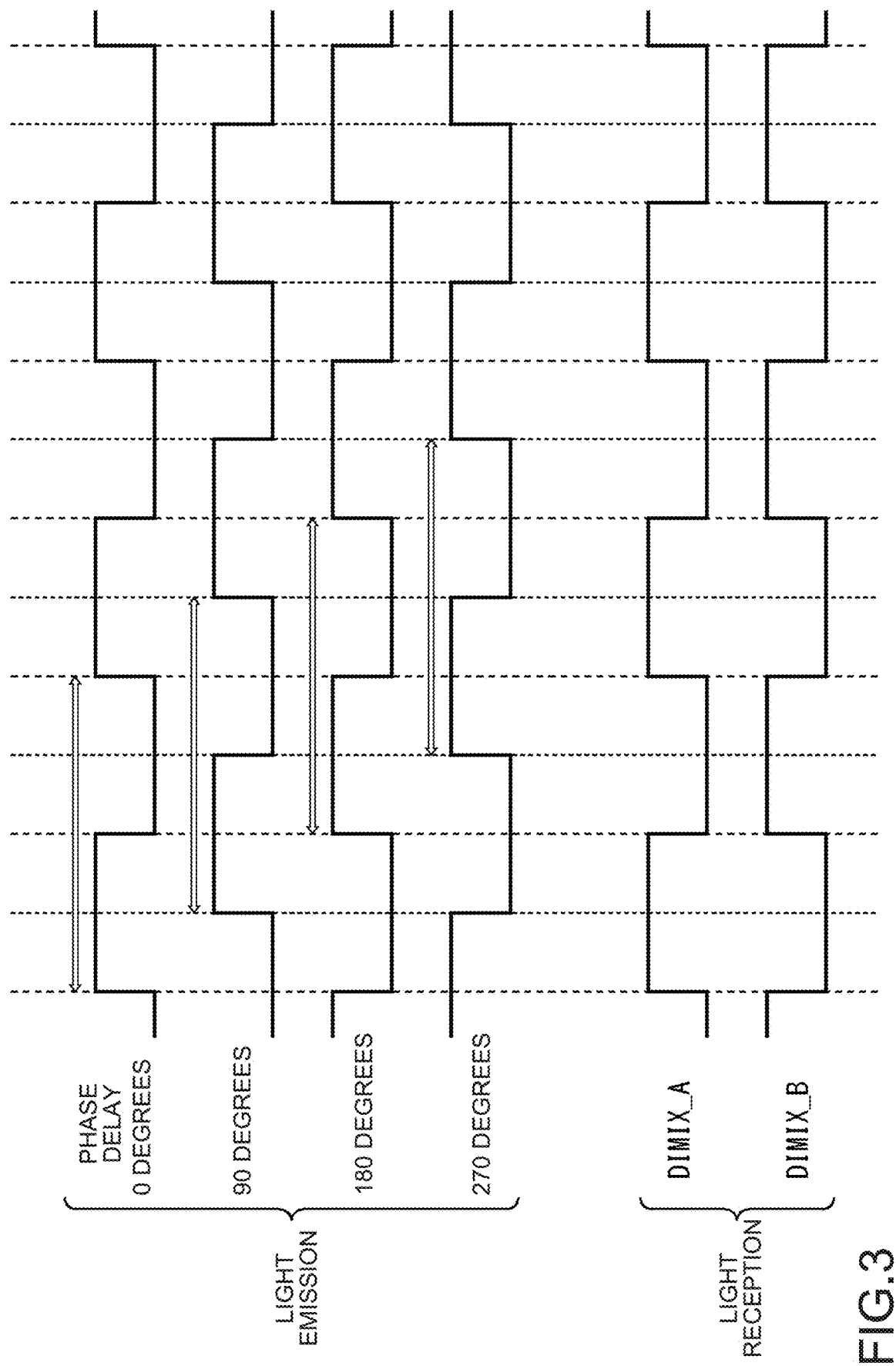
FIG. 3 is a diagram showing an example of four irradiated light each of which has a delayed phase of 90°.

For example, as shown in FIG. 3, four irradiated light each of which has a delayed phase of 90° is used. That is, using irradiated light having a phase delay of 0° as a reference, irradiated light having a phase delay of 90°, irradiated light having a phase delay of 180°, and irradiated light having a phase delay of 270°, four periods (quad) in which the detection signals A and B are detected are provided.

Figure 4:
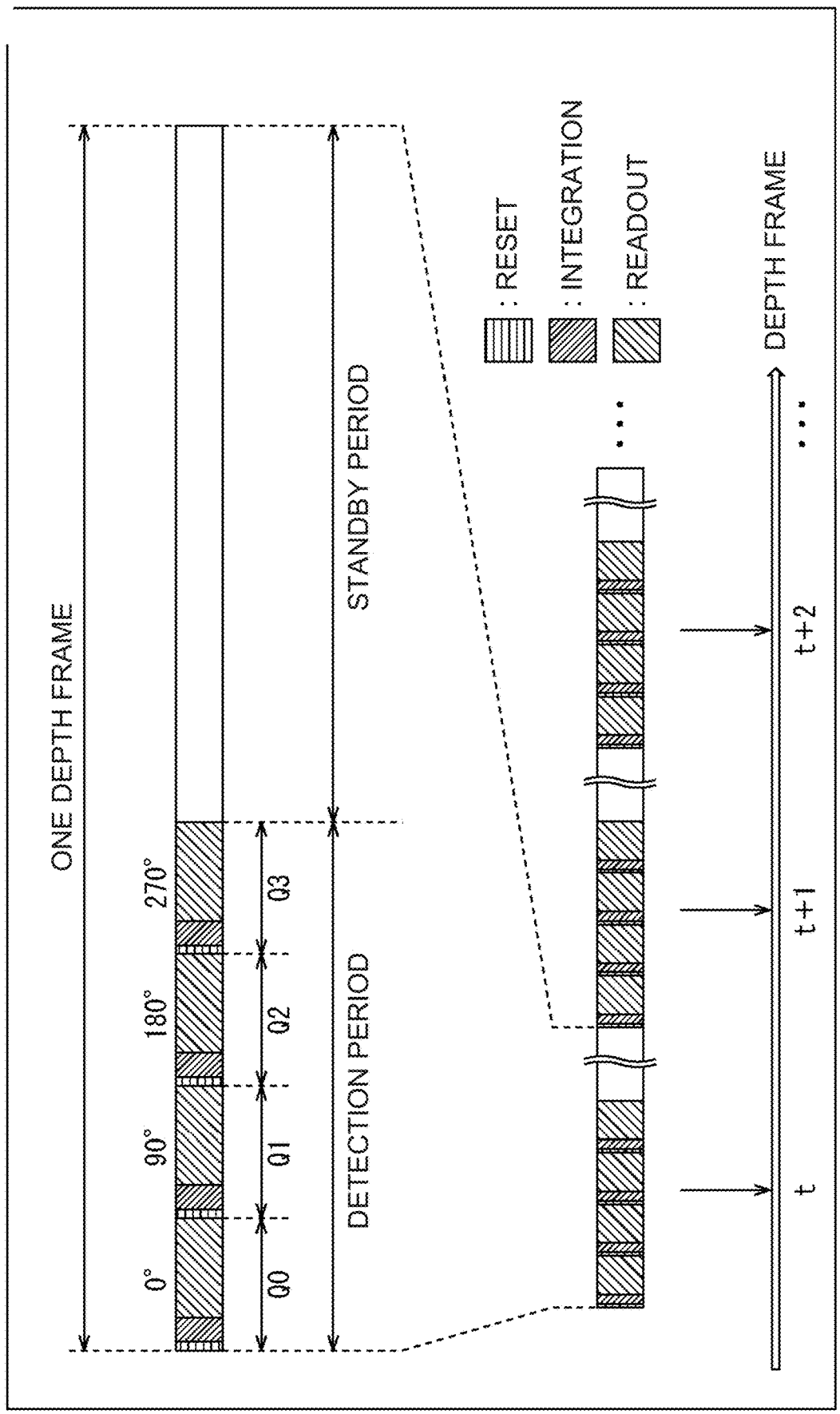
FIG. 4 is a diagram for describing ranging using four detection periods based on the four irradiated light each of which has a delayed phase of 90°.

That is, as shown in FIG. 4, a detection period Q0 in which reflected light generated from the irradiated light having a phase delay of 0° is detected, a detection period Q1 in which reflected light generated from the irradiated light having a phase delay of 90° is detected, a detection period Q2 in which reflected light generated from the irradiated light having a phase delay of 180° is detected, and a detection period Q3 in which reflected light generated from the irradiated light having a phase delay of 270° is detected are, for example, sequentially provided. Further, in each of the detection periods Q1, Q2, Q3, and Q4, a reset period in which the charges are reset, an integration period in which the charges are accumulated, and a readout period in which the charges are read out are provided.

By a detection period including the detection periods Q0, Q1, Q2, and Q3 and the following standby period (dead time/idle time), one depth frame for outputting one depth map is constituted. Such one depth frame is repeatedly output. Thus, depth frames such as the depth frame of frame number t, the depth frame of frame number t+1, and the depth frame of frame number t+2 are sequentially output at a prescribed frame rate.

Figure 5:
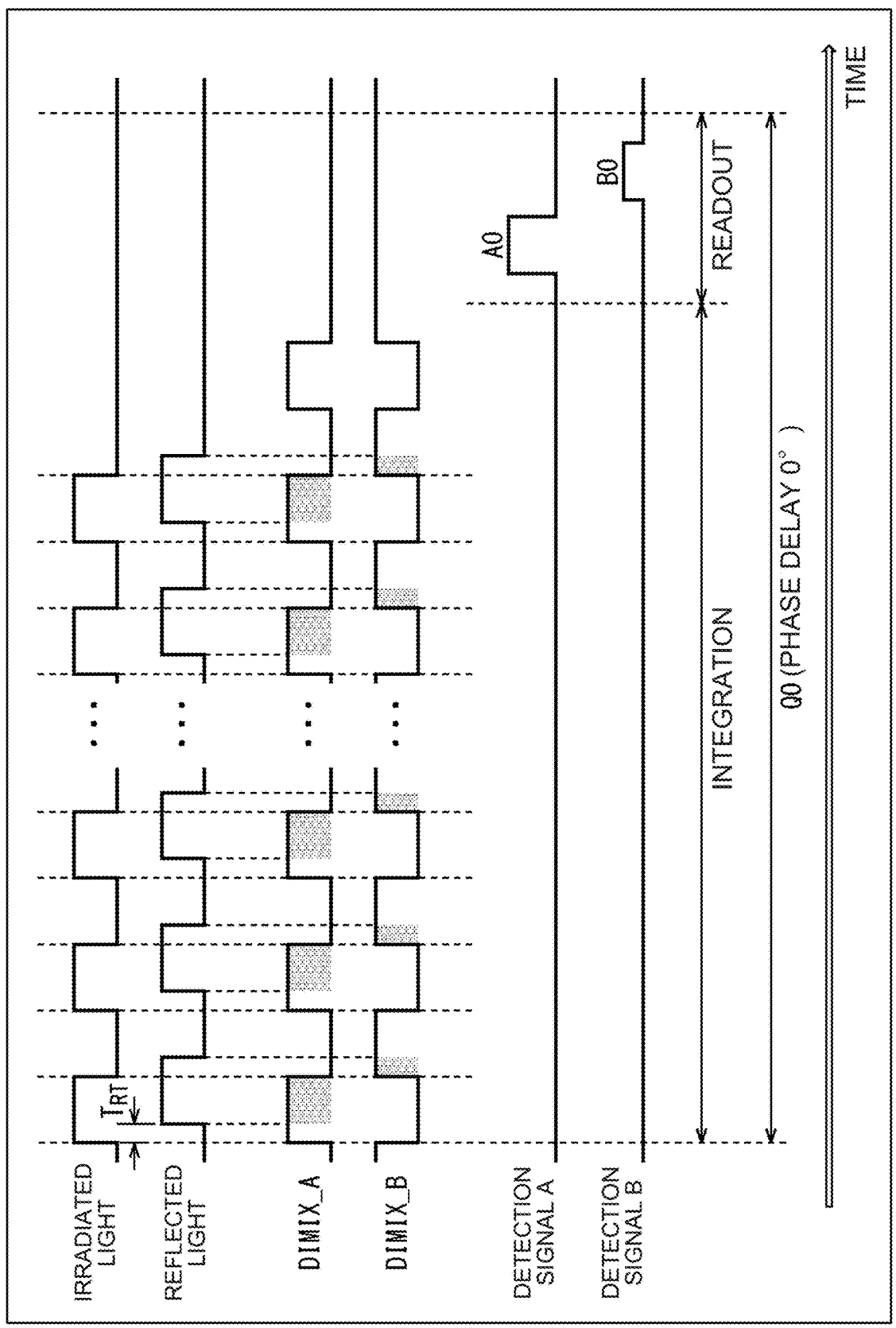
FIG. 5 is a diagram showing an example of detection signals in a detection period based on irradiated light having a phase delay of 0°.

FIG. 5 shows an example of the irradiated light, the reflected light, the distribution signals DIMIX_A and DIMIX_B, and the detection signals A and B in the detection period Q0. As shown in FIG. 5, charges are distributed to the taps 32A and 32B by an amount corresponding to a delay time $T_{RT}$ and accumulated in an integration period. Then, in a readout period, the charges each accumulated in the integration period are read out, and detection signals A0 and B0 in the detection period Q0 are output.

Figure 6:
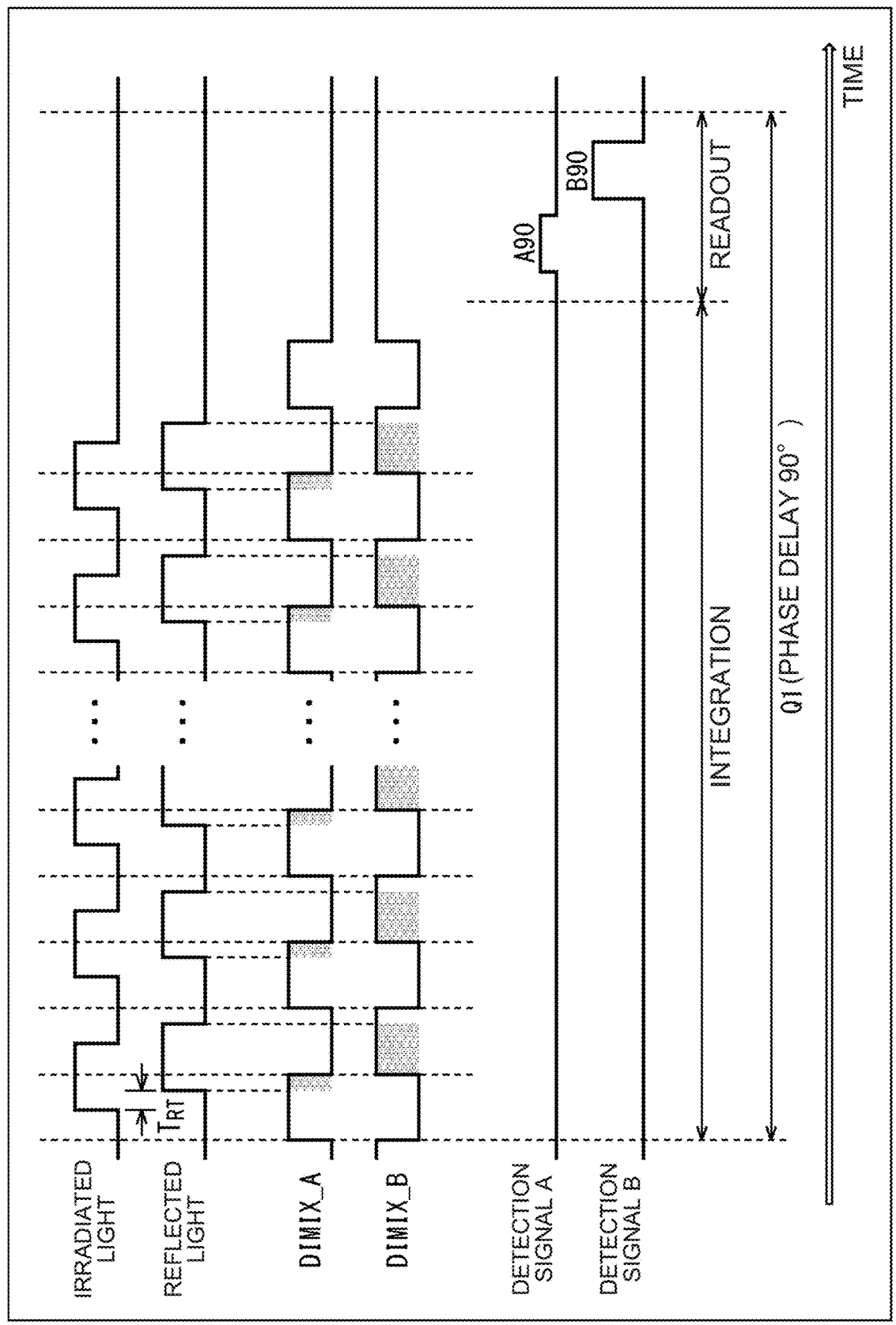
FIG. 6 is a diagram showing an example of detection signals in a detection period based on irradiated light having a phase delay of 90°.

FIG. 6 shows an example of the irradiated light, the reflected light, the distribution signals DIMIX_A and DIMIX_B, and the detection signals A and B in the detection period Q1. As shown in FIG. 6, charges are distributed to the taps 32A and 32B by an amount corresponding to a delay time $T_{RT}$ and accumulated in an integration period. Then, in a readout period, the charges each accumulated in the integration period are read out, and detection signals A90 and B90 in the detection period Q1 are output.

Figure 7:
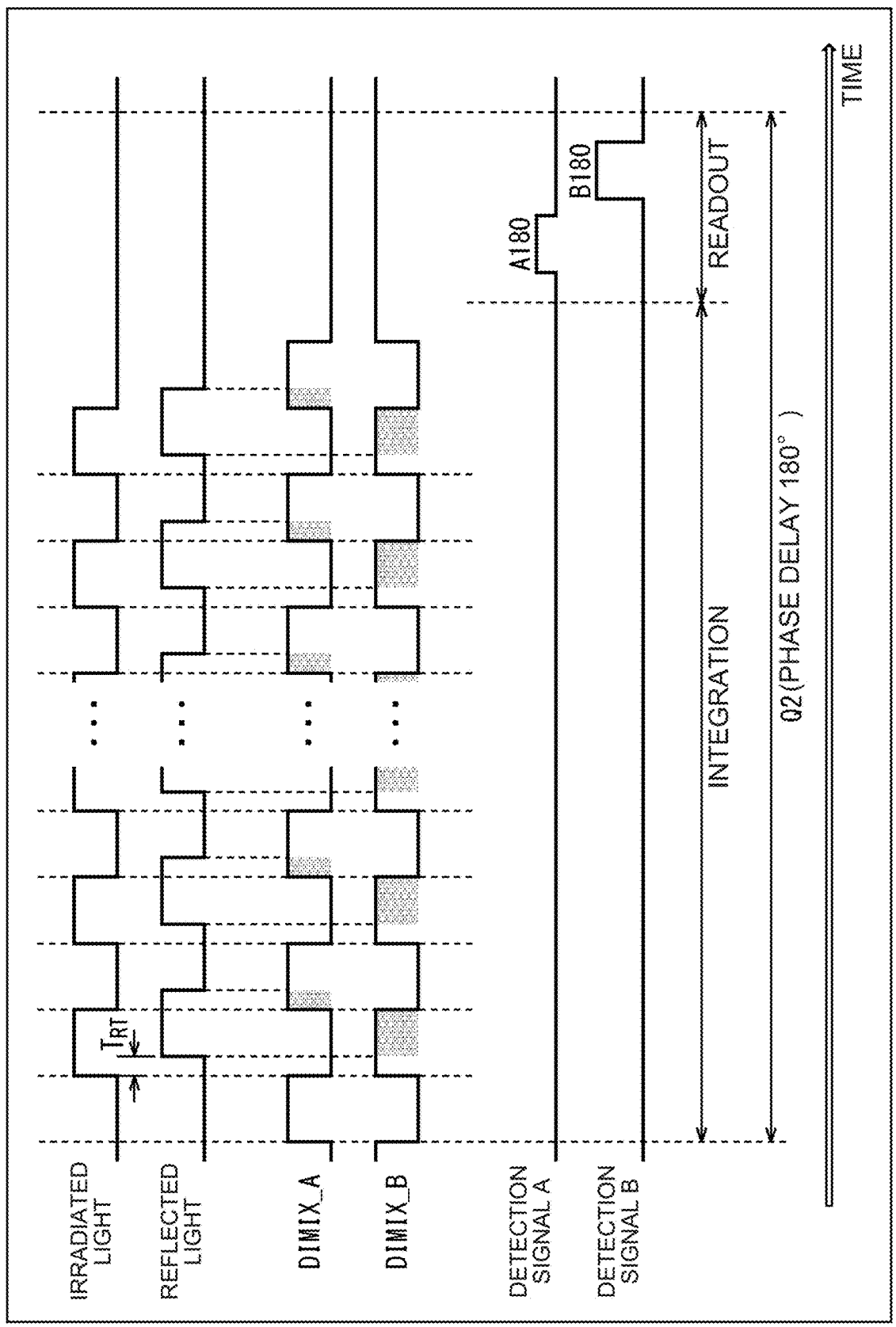
FIG. 7 is a diagram showing an example of detection signals in a detection period based on irradiated light having a phase delay of 180°.

FIG. 7 shows an example of the irradiated light, the reflected light, the distribution signals DIMIX_A and DIMIX_B, and the detection signals A and B in the detection period Q2. As shown in FIG. 7, charges are distributed to the taps 32A and 32B by an amount corresponding to a delay time $T_{RT}$ and accumulated in an integration period. Then, in a readout period, the charges each accumulated in the integration period are read out, and detection signals A180 and B180 in the detection period Q2 are output.

Figure 8:
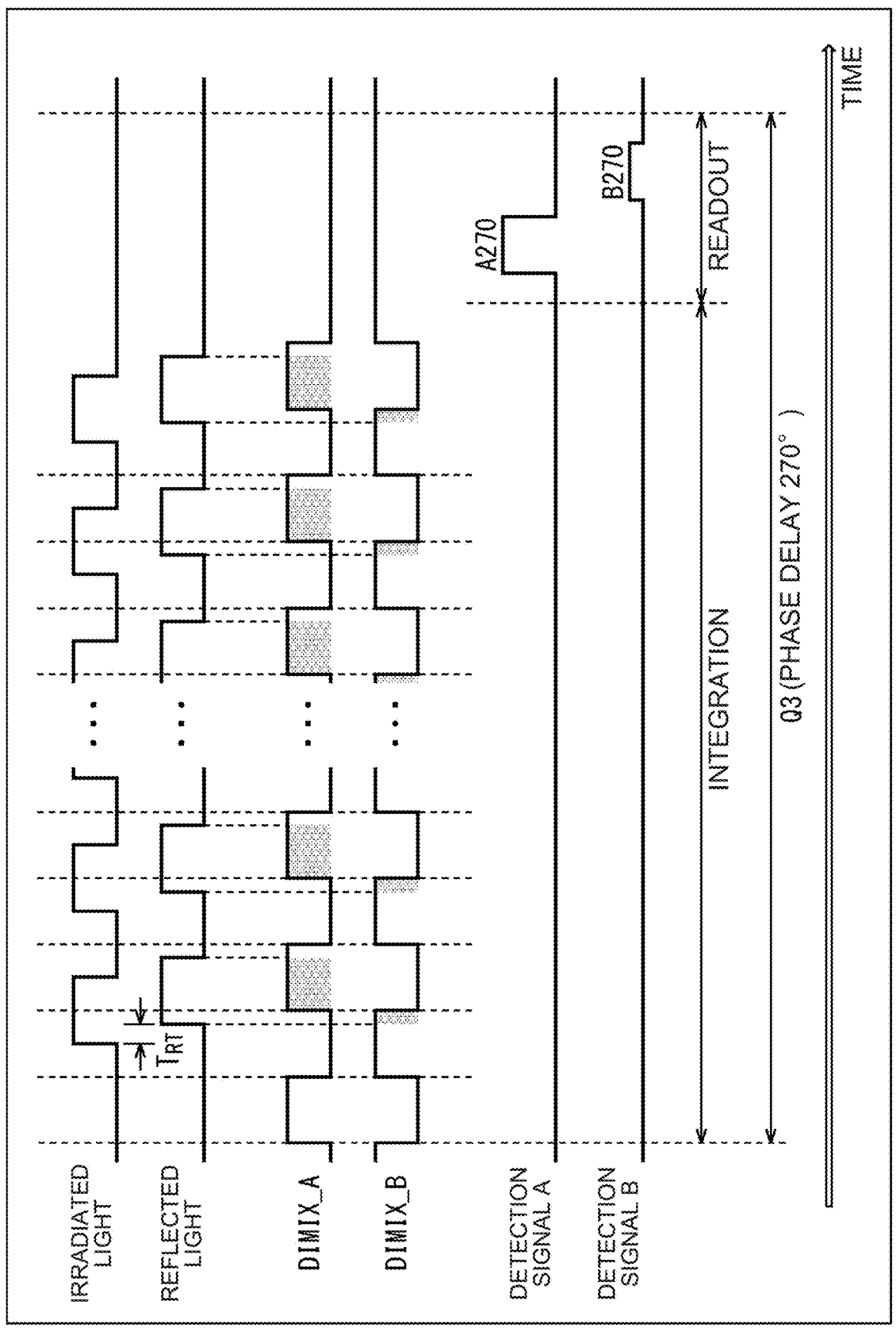
FIG. 8 is a diagram showing an example of detection signals in a detection period based on irradiated light having a phase delay of 270°.

FIG. 8 shows an example of the irradiated light, the reflected light, the distribution signals DIMIX_A and DIMIX_B, and the detection signals A and B in the detection period Q3. As shown in FIG. 8, charges are distributed to the taps 32A and 32B by an amount corresponding to a delay time $T_{RT}$ and accumulated in an integration period. Then, in a readout period, the charges each accumulated in the integration period are read out, and detection signals A270 and B270 in the detection period Q3 are output.

As described above, the detection signals A0 and B0 are detected by the irradiated light having a phase delay of 0° in the detection period Q0, and the detection signals A90 and B90 are detected by the irradiated light having a phase delay of 90° in the detection period Q1. Similarly, the detection signals A180 and B180 are detected by the irradiated light having a phase delay of 180° in the detection period Q2, and the detection signals A270 and B270 are detected by the irradiated light having a phase delay of 270° in the detection period Q3.

Figure 9:
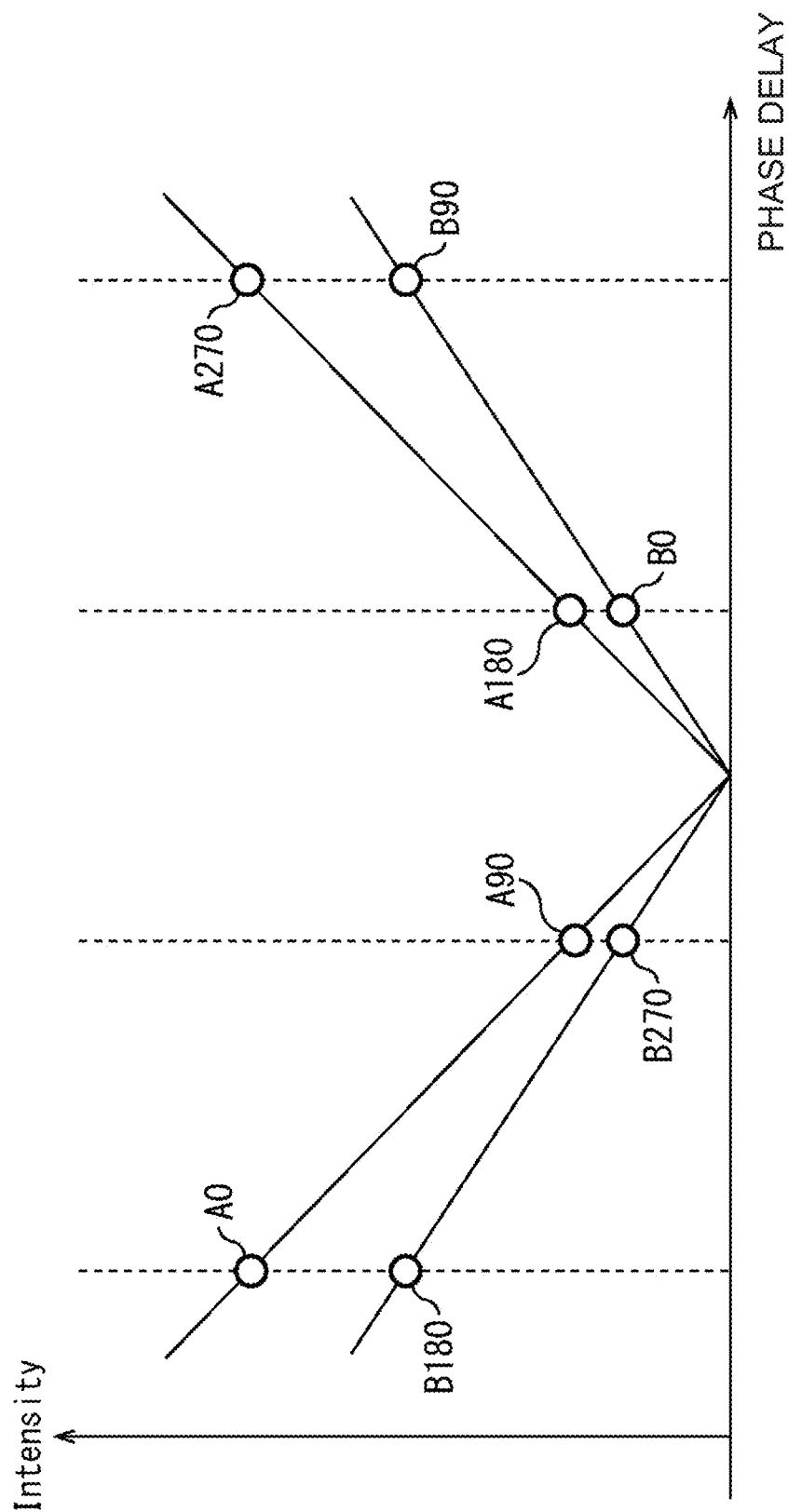
FIG. 9 is a diagram for describing the relationship between the detection signals A0 to A270 and the detection signals B0 to B270.

Here, FIG. 9 shows the relationship between the detection signals A0 to A270 and the detection signals B0 to B270 when the phase delays and the intensity of the signals are expressed by a horizontal axis and a vertical axis, respectively.

The relationship between the detection signals A0 and B0, the relationship between the detection signals A90 and B90, the relationship between the detection signals S180 and B180, and the relationship between the detection signals A270 and B270 are modeled as shown in the following Formula (1)

(Formula 1)

$$\begin{cases} A0 - B0 = \text{Offset} - \text{Gain} \times \cos(\theta) \\ A180 - B180 = \text{Offset} - \text{Gain} \times \cos(\theta + \pi) \\ A90 - B90 = \text{Offset} - \text{Gain} \times \cos(\theta + 1/2\pi) \\ A270 - B270 = \text{Offset} - \text{Gain} \times \cos(\theta + 3/2\pi) \end{cases} \quad (1)$$

By performing such modeling and calculating an offset, a gain, and an angle θ from Formula (1), it is possible to perform ranging in which influence due to a difference in the characteristics between the taps 32A and 32B is, for example, cancelled. That is, in order to cancel differences in the offset Offset and the gain Gain between the taps 32A and 32B, the eight detection signals (the detection signals A0 to A270 and the detection signals B0 to B270) detected in the four detection periods Q0 to Q3 are desirably used.

To this end, the ranging module 11 calculates the offset and the gain of the tap 32A and the offset and the gain of the tap 32B and compensates for their differences. Thus, the ranging module 11 is allowed to perform the ranging in which influence due to the difference in the characteristics between the taps 32A and 32B is cancelled only by detecting the detection signals A and B in each of the two detection periods Q0 and Q1 (or the detection periods Q2 and Q3).

For example, the following Formula (2) shows the relationship between an offset Offset_A and a gain Gain_A of the tap 32A and an offset Offset_B and a gain Gain_B of the tap 32B.

(Formula 2)

$$\begin{cases} \text{Gain\_A}(A0 - \text{Offset\_A}) = \text{Gain\_B}(B180 - \text{Offset\_B}) \\ \text{Gain\_A}(A90 - \text{Offset\_A}) = \text{Gain\_B}(B270 - \text{Offset\_B}) \\ \text{Gain\_A}(A180 - \text{Offset\_A}) = \text{Gain\_B}(B0 - \text{Offset\_B}) \\ \text{Gain\_A}(A270 - \text{Offset\_A}) = \text{Gain\_B}(B90 - \text{Offset\_B}) \end{cases} \quad (2)$$

Here, the offsets Offset_A and Offset_B have fixed values for each of the pixel circuits 21 and may be calculated in advance. On the other hand, the gains Gain_A and Gain_B are likely to fluctuate with the incident angle of light depending on the structure of the pixel circuits 21 and thus are desirably calculated for each of depth frames.

That is, the ranging module 11 detects the detection signals A0 to A270 and the detection signals B0 to B270 in advance or in initial processing for performing ranging and solves a simultaneous equation shown in the following Formula (3) to calculate the offsets Offset_A and Offset_B.

(Formula 3)

$$\begin{cases} (A180 - \text{Offset\_A}) = \dfrac{\text{Gain\_A}}{\text{Gain\_B}}(B0 - \text{Offset\_B}) \\ \qquad\qquad = \dfrac{A90 - A0}{B0 - B90}(B0 - \text{Offset\_B}) \\ (A270 - \text{Offset\_A}) = \dfrac{\text{Gain\_A}}{\text{Gain\_B}}(B90 - \text{Offset\_B}) \\ \qquad\qquad = \dfrac{A90 - A0}{B0 - B90}(B90 - \text{Offset\_B}) \end{cases} \quad (3)$$

Then, the ranging module 11 stores the offsets Offset_A and Offset_B as offset parameters.

Subsequently, the ranging module 11 calculates gain parameters (Gain_A and Gain_B) as shown in the following Formula (4) at timing at which the detection signals A0 and B0 and the detection signals A90 and B90 are detected.

(Formula 4)

$$\frac{\text{Gain\_A}}{\text{Gain\_B}} = \frac{A90 - A0}{B0 - B90} \quad (4)$$

Further, the ranging module 11 calculates gain parameters (Gain_A and Gain_B) as shown in the following Formula (5) at timing at which the detection signals A180 and A270 and the detection signals B180 and B270 are detected.

(Formula 5)

$$\frac{\text{Gain\_A}}{\text{Gain\_B}} = \frac{A180 - A270}{B270 - B180} \quad (5)$$

Accordingly, the ranging module 11 may apply correction using the offset parameters (Offset_A and Offset_B) and the gain parameters (Gain_A and Gain_B) according to the following Formula (6) at timing at which the detection signals A0, B0, A90, and B90 are detected.

(Formula 6)

$$\begin{cases} A'180 = \frac{\text{Gain\_A}}{\text{Gain\_B}}(B0 - \text{Offset\_B}) + \text{Offset\_A} \\ A'270 = \frac{\text{Gain\_A}}{\text{Gain\_B}}(B90 - \text{Offset\_B}) + \text{Offset\_A} \end{cases} \quad (6)$$

OR $$\begin{cases} B'180 = \frac{\text{Gain\_B}}{\text{Gain\_A}}(A0 - \text{Offset\_A}) + \text{Offset\_B} \\ B'270 = \frac{\text{Gain\_B}}{\text{Gain\_A}}(A90 - \text{Offset\_A}) + \text{Offset\_B} \end{cases}$$

Thus, the ranging module 11 calculates correction detection signals A'180 and A'270 on the basis of the detection signal A and calculates correction detection signals B'180 and B'270 on the basis of the detection signal B.

Figure 10:
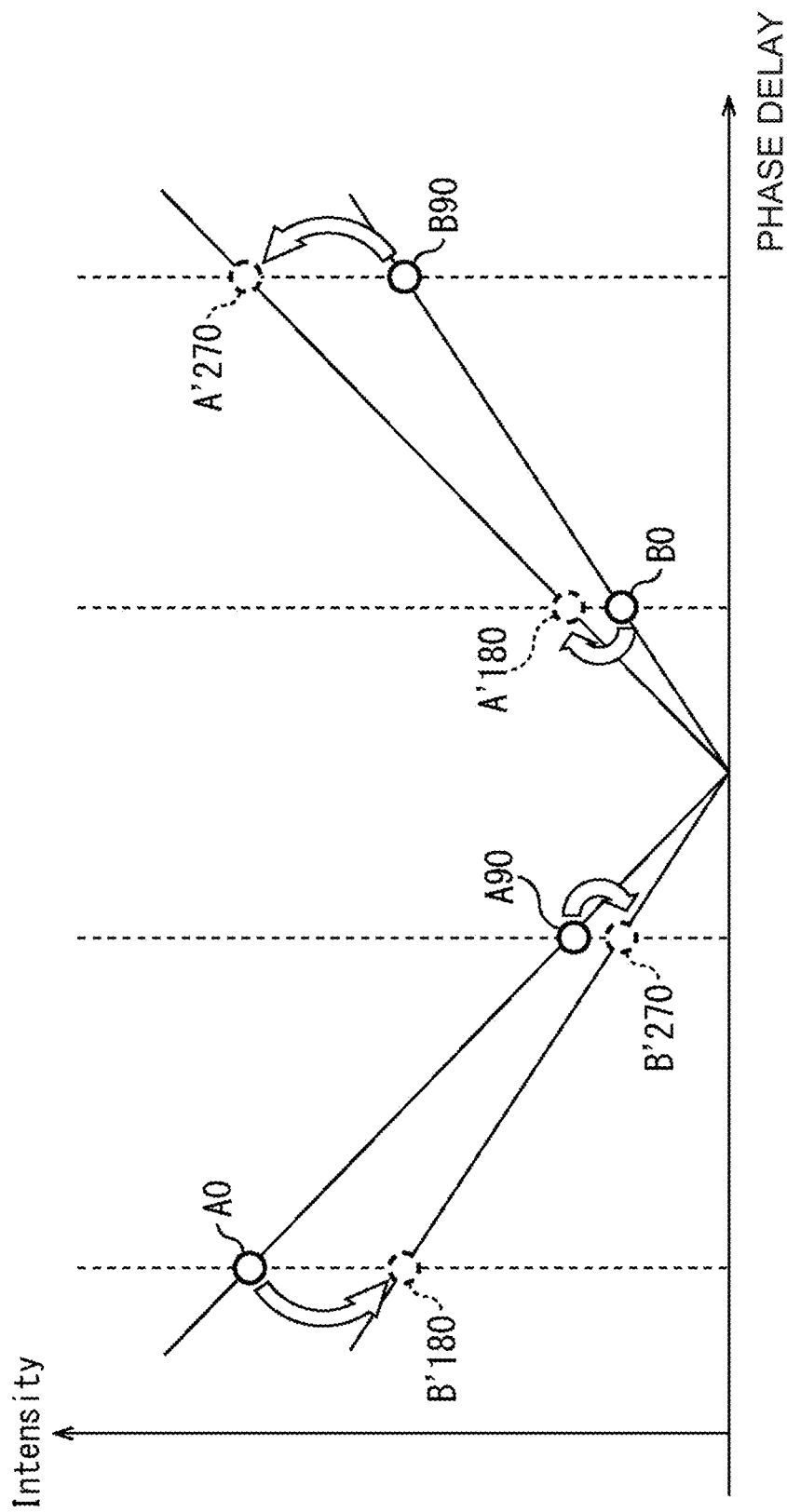
FIG. 10 is a diagram for describing a correction operation.

That is, as shown in FIG. 10, the ranging module 11 performs correction on the detection signal B0 to calculate the correction detection signal A'180 and performs correction on the detection signal B90 to calculate the correction detection signal A'270. Alternatively, the ranging module 11 performs correction on the detection signal A0 to calculate the correction detection signal B'180 and performs correction on the detection signal A90 to calculate the correction detection signal B'270.

Accordingly, the ranging module 11 may cancel the influence due to the difference in the characteristics between the taps 32A and 32B using the detection signals A0 and A90 and the correction detection signals A'180 and A'270 to calculate depth and confidence. Alternatively, the ranging module 11 may cancel the influence due to the difference in the characteristics between the taps 32A and 32B using the detection signals B0 and B90 and the correction detection signals B'180 and B'270 to calculate depth and confidence.

Similarly, the ranging module 11 may apply correction using the offset parameters (Offset_A and Offset_B) and the gain parameters (Gain_A and Gain_B) according to the following Formula (7) at timing at which the detection signals A180, B270, A180, and B270 are detected.

(Formula 7)

$$\begin{cases} A'0 = \frac{\text{Gain\_A}}{\text{Gain\_B}}(B180 - \text{Offset\_B}) + \text{Offset\_A} \\ A'90 = \frac{\text{Gain\_A}}{\text{Gain\_B}}(B270 - \text{Offset\_B}) + \text{Offset\_A} \end{cases} \quad (7)$$

OR $$\begin{cases} B'0 = \frac{\text{Gain\_B}}{\text{Gain\_A}}(A180 - \text{Offset\_A}) + \text{Offset\_B} \\ B'90 = \frac{\text{Gain\_B}}{\text{Gain\_A}}(A270 - \text{Offset\_A}) + \text{Offset\_B} \end{cases}$$

Thus, the ranging module 11 calculates correction detection signals A'0 and A'90 on the basis of the detection signal A and calculates correction detection signals B'0 and B'90 on the basis of the detection signal B.

Accordingly, the ranging module 11 may cancel the influence due to the difference in the characteristics between the taps 32A and 32B using the correction detection signals A'0 and A'90 and the detection signals A180 and A270 to calculate depth and confidence. Alternatively, the ranging module 11 may cancel the influence due to the difference in the characteristics between the taps 32A and 32B using the correction detection signals B'0 and B'90 and the detection signals B180 and B270 to calculate depth and confidence.

As described above, the ranging module 11 calculates the offset parameters (Offset_A and Offset_B) in advance and calculates the gain parameters (Gain_A and Gain_B) for each depth frame to perform ranging in which the influence due to the difference in the characteristics between the taps 32A and 32B is cancelled.

Figure 11:
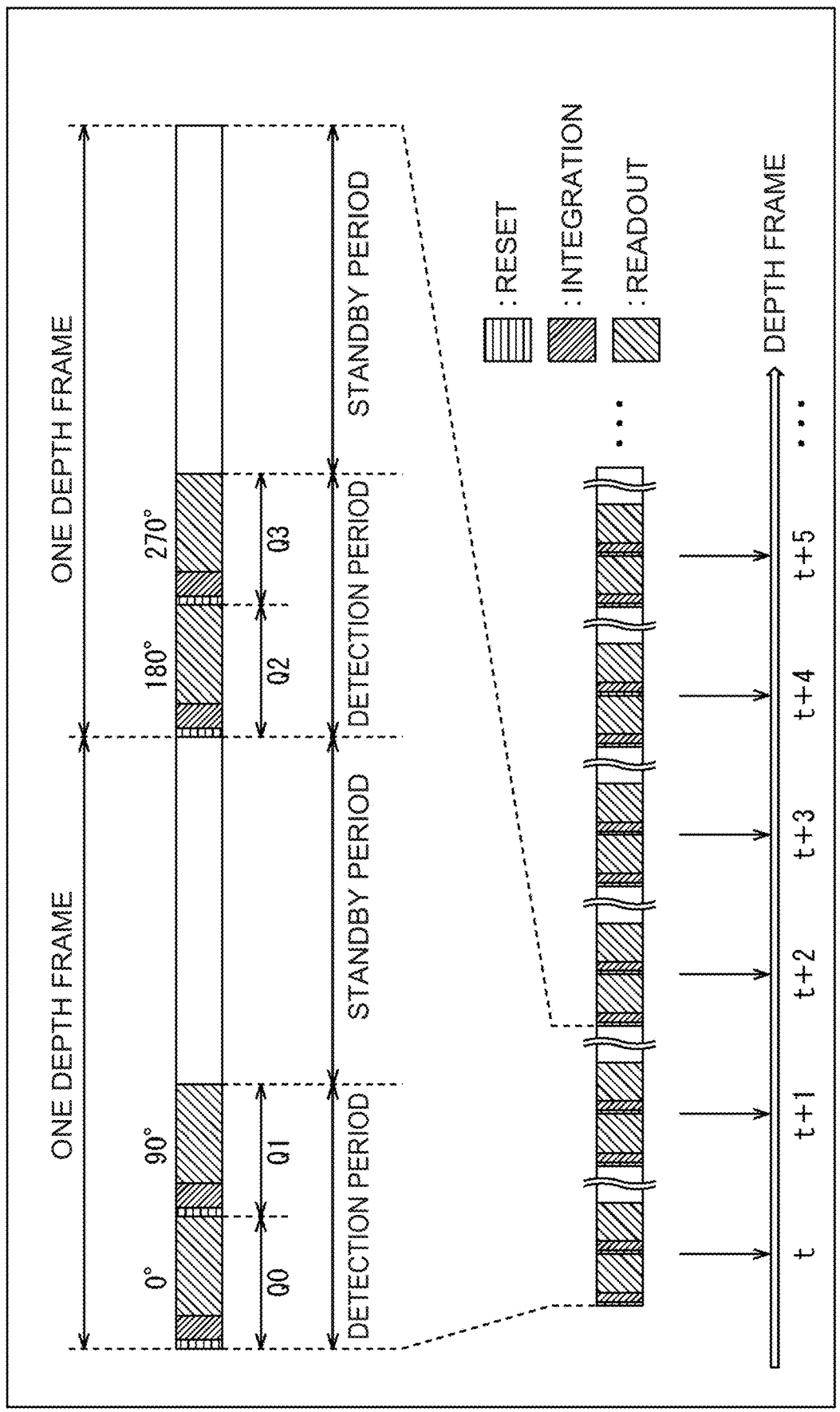
FIG. 11 is a diagram for describing ranging using two detection periods.

For example, as shown in FIG. 11, the ranging module 11 detects four detection signals (the detection signals A0, B0, A90, and B90) in the two detection periods Q0 and Q1 to output the depth frame of frame number t. Subsequently, the ranging module 11 detects four detection signals (the detection signals A180, B180, A270, and B270) in the two detection periods Q2 and Q3 to output the depth frame of frame number t+1.

Accordingly, compared with a ranging method in which one depth frame is output through the four detection periods Q0 to Q3 as described above with reference to FIG. 4, the ranging module 11 may reduce a time for outputting one depth frame by half. That is, the ranging module 11 may double a frame rate over the related art.

(Configuration Example of Ranging Operation Processing Unit)

Figure 12:
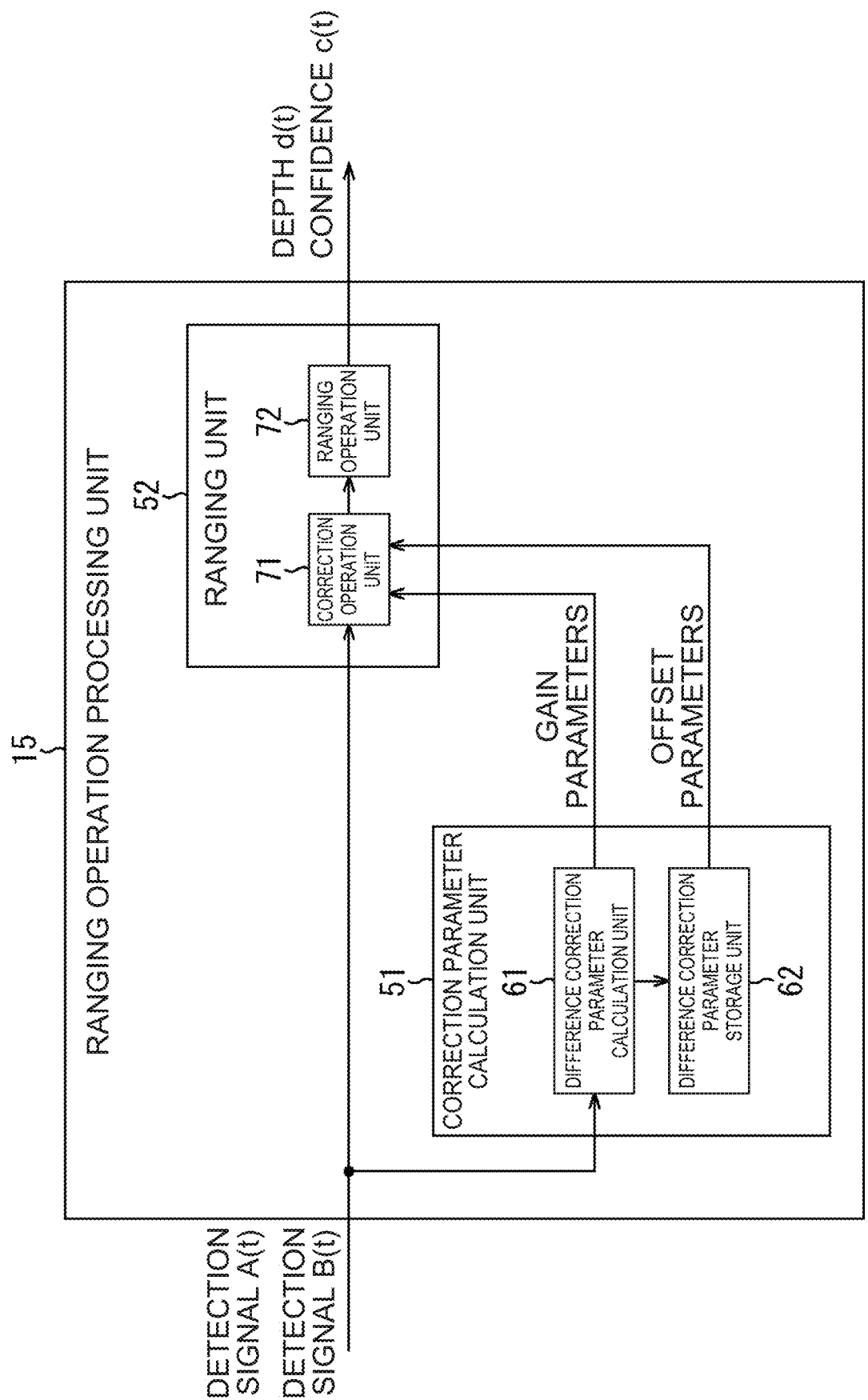
FIG. 12 is a block diagram showing a first configuration example of a ranging operation processing unit.

FIG. 12 is a block diagram showing a first configuration example of the ranging operation processing unit 15.

The ranging operation processing unit 15 outputs depth d(t) constituting the depth map of frame number t and confidence c(t) constituting the confidence map of the frame number t using detection signals A(t) and B(t) supplied from the light reception unit 14 as image data.

First, when receiving four detection signals (detection signals A0($t$), B0($t$), A90($t$), and B90($t$)) detected by irradiated light having a phase delay of 0° and irradiated light having a phase delay of 90°, the ranging operation processing unit 15 outputs the depth d(t) and the confidence c(t) of the depth frame of the frame number t. Subsequently, when receiving four detection signals (detection signals A180($t$+1), B180($t$+1), A270($t$+1), and B270($t$+1)) detected by irradiated light having a phase delay of 180° and irradiated light having a phase delay of 270°, the ranging operation processing unit 15 outputs the depth d(t+1) and the confidence c(t+1) of the depth frame of frame number t+1.

As shown in FIG. 12, the ranging operation processing unit 15 includes a correction parameter calculation unit 51 and a ranging unit 52. Further, the correction parameter calculation unit 51 has a difference correction parameter calculation unit 61 and a difference correction parameter storage unit 62, and the ranging unit 52 has a correction operation unit 71 and a ranging operation unit 72.

The difference correction parameter calculation unit 61 solves the following Formula (8) about offsets Offset_A and Offset_B in, for example, several frames at the start of ranging.

(Formula 8)

$$\begin{cases} (A'180(t) - \text{Offset\_A}) = \dfrac{\text{Gain\_A}}{\text{Gain\_B}}(B0(t) - \text{Offset\_B}) \\ (A'270(t) - \text{Offset\_A}) = \dfrac{\text{Gain\_A}}{\text{Gain\_B}}(B90(t) - \text{Offset\_B}) \end{cases} \quad (8)$$

Thus, the difference correction parameter calculation unit 61 calculates the offsets Offset_A and Offset_B and stores the same in the difference correction parameter storage unit 62. Note that the offsets Offset_A and Offset_B may be calculated in advance at, for example, the examination of the ranging module 11 or the like and stored in the difference correction parameter storage unit 62 at the shipment of the ranging module 11.

Then, when receiving the four detection signals (the detection signals A0(t), B0(t), A90(t), and B90(t)) detected by the irradiated light having a phase delay of 0° and the irradiated light having a phase delay of 90°, the difference correction parameter calculation unit 61 calculates the following Formula (9). Thus, the difference correction parameter calculation unit 61 calculates the gain parameters (Gain_A and Gain_B(t)) and supplies the same to the correction operation unit 71 of the ranging unit 52.

(Formula 9)

$$\dfrac{\text{Gain\_A}}{\text{Gain\_B}}(t) = \dfrac{A90(t) - A0(t)}{B0(t) - B90(t)} \quad (9)$$

Subsequently, when receiving the four detection signals (the detection signals A180(t+1), B180(t+1), A270(t+1), and B270(t+1)) detected by the irradiated light having a phase delay of 180° and the irradiated light having a phase delay of 270°, the difference correction parameter calculation unit 61 calculates the following Formula (10). Thus, the difference correction parameter calculation unit 61 calculates the gain parameters (Gain_A and Gain_B (t+1)) and supplies the same to the correction operation unit 71 of the ranging unit 52.

(Formula 10)

$$\dfrac{\text{Gain\_A}}{\text{Gain\_B}}(t+1) = \dfrac{A180(t+1) - A270(t+1)}{B270(t+1) - B180(t+1)} \quad (10)$$

The difference correction parameter storage unit 62 stores the offset parameters (Offset_A and Offset_B) calculated by the difference correction parameter calculation unit 61 and supplies the same to the correction operation unit 71. Note that the difference correction parameter calculation unit 61 calculates gain parameters and offset parameters for each of the pixel circuits 21, and that the difference correction parameter storage unit 62 maintains the offset parameters for each of the pixel circuits 21.

The correction operation unit 71 receives the gain parameters (Gain_A and Gain_B) from the difference correction parameter calculation unit 61 at timing at which the four detection signals (the detection signals A0(t), B0(t), A90(t), and B90(t)) detected by the irradiated light having a phase delay of 0° and the irradiated light having a phase delay of 90° are supplied. Accordingly, the correction operation unit 71 may perform an operation shown in the following Formula (11) at this timing to calculate correction detection signals A'180(t) and A'270(t) or correction detection signals B'180(t) and B'270(t).

(Formula 11)

$$\begin{cases} A'180(t) = \left\{\dfrac{\text{Gain\_A}}{\text{Gain\_B}}(t)\right\}(B0(t) - \text{Offset\_B}) + \text{Offset\_A} \\ A'270(t) = \left\{\dfrac{\text{Gain\_A}}{\text{Gain\_B}}(t)\right\}(B90(t) - \text{Offset\_B}) + \text{Offset\_A} \end{cases} \quad (11)$$

OR $$\begin{cases} B'180(t) = \left\{\dfrac{\text{Gain\_A}}{\text{Gain\_B}}(t)\right\}(A0(t) - \text{Offset\_A}) + \text{Offset\_B} \\ B'270(t) = \left\{\dfrac{\text{Gain\_A}}{\text{Gain\_B}}(t)\right\}(A90(t) - \text{Offset\_A}) + \text{Offset\_B} \end{cases}$$

Thus, the correction operation unit 71 supplies the correction detection signals A'180(t) and A'270(t) or the correction detection signals B'180(t) and B'270(t) to the ranging operation unit 72 at the timing at which the four detection signals detected by the irradiated light having a phase delay of 0° and the irradiated light having a phase delay of 90° are supplied.

Subsequently, the correction operation unit 71 receives the gain parameters (Gain_A and Gain_B (t+1)) from the difference correction parameter calculation unit 61 at timing at which the four detection signals (the detection signals A180(t+1), B180(t+1), A270(t+1), and B270(t+1)) detected by the irradiated light having a phase delay of 180° and the irradiated light having a phase delay of 270° are supplied. Accordingly, the correction operation unit 71 may perform an operation shown in the following Formula (12) at this timing to calculate correction detection signals A'0(t+1) and A'90(t+1) or correction detection signals B'0(t+1) and B'90(t+1).

(Formula 12)

$$\begin{cases} A'0(t+1) = \left\{\dfrac{\text{Gain\_A}}{\text{Gain\_B}}(t+1)\right\}(B180(t+1) - \text{Offset\_B}) + \text{Offset\_A} \\ A'90(t+1) = \left\{\dfrac{\text{Gain\_A}}{\text{Gain\_B}}(t+1)\right\}(B270(t+1) - \text{Offset\_B}) + \text{Offset\_A} \end{cases} \quad (12)$$

OR $$\begin{cases} B'0(t+1) = \left\{\dfrac{\text{Gain\_A}}{\text{Gain\_B}}(t+1)\right\}(A180(t+1) - \text{Offset\_A}) + \text{Offset\_B} \\ B'90(t+1) = \left\{\dfrac{\text{Gain\_A}}{\text{Gain\_B}}(t+1)\right\}(A270(t+1) - \text{Offset\_A}) + \text{Offset\_B} \end{cases}$$

Thus, the correction operation unit 71 supplies the correction detection signals A'0(t+1) and A'90(t+1) or the correction detection signals B'0(t+1) and B'90(t+1) at the timing at which the four detection signals detected by the irradiated light having a phase delay of 180° and the irradiated light having a phase delay of 270° are supplied.

The ranging operation unit 72 receives the correction detection signals A'180(t) and A'270(t) or the correction detection signals B'180(t) and B'270(t) at timing at which the four detection signals (the detection signals A0(t), B0(t), A90(t), and B90(t)) detected by the irradiated light having a phase delay of 0° and the irradiated light having a phase delay of 90° are supplied. Then, the ranging operation unit 72 may perform an operation shown in the following Formula (13) to calculate the depth d(t) and the confidence c(t) of the depth frame of the frame number t.

(Formula 13)

$$\begin{cases} d(t) = \dfrac{c}{4\pi f}\tan^{-1}\left(\dfrac{D1(t) - D3(t)}{D0(t) - D2(t)}\right) \\ c(t) = \sqrt{I(t)^2 + Q(t)^2} \end{cases} \quad (13)$$

$$Q(t) = D1(t) - D3(t)$$

$$I(t) = D0(t) - D2(t)$$

However, in the above formula (13), the ranging operation unit 72 may use one of D0(t)=A0(t), D2(t)=A'180(t), D1(t)=A90(t), D3(t)=A'270(t) and D2(t)=B'180(t), D0(t)=B0(t), D1(t)=B'270(t), and D3(t)=B90(t). Alternatively, in the above Formula (13), the ranging operation unit 72 may use the averages between D0(t)=A0(t), D2(t)=A'180 (t), D1(t)=A90(t), D3(t)=A'270(t) and D2 (t)=B'180(t), D0(t)=B0(t), D1(t)=B'270(t), and D3 (t)=B90(t).

Subsequently, the ranging operation unit 72 receives the correction detection signals A'0(t+1) and A'90(t+1) or the correction detection signals B'0(t+1) and B'90(t+1) at timing at which the four detection signals (the detection signals A180(t+1), B180(t+1), A270(t+1), and B270(t+1)) detected by the irradiated light having a phase delay of 180° and the irradiated light having a phase delay of 270° are supplied. Then, the ranging operation unit 72 may perform an operation shown in the following Formula (14) to calculate the depth d(t+1) and the confidence c(t+1) of the depth frame of the frame number t+1.

(Formula 14)

$$\begin{cases} d(t+1) = \dfrac{c}{4\pi f}\tan^{-1}\left(\dfrac{D1(t+1) - D3(t+1)}{D0(t+1) - D2(t+1)}\right) \\ c(t+1) = \sqrt{I(t+1)^2 + Q(t+1)^2} \end{cases} \quad (14)$$

$$Q(t+1) = D1(t+1) - D3(t+1)$$

$$I(t+1) = D0(t+1) - D2(t+1)$$

However, in the above formula (14), the ranging operation unit 72 may use one of D2(t+1)=A180(t+1), D0(t+1)=A'0 (t+1), D3(t+1)=A270(t+1), D1(t+1)=A'90(t+1) and D0 (t+1)=B'0(t+1), D2(t+1)=B180(t+1), D1(t+1)=B'90(t+1), and D3(t+1)=B270(t+1). Alternatively, in the above Formula (14), the ranging operation unit 72 may use the averages between D0(t+1)=A'0(t+1), D2(t+1)=A'180(t+1), D1(t+1)=A90(t+1), and D3(t+1)=A'270(t+1) and D2(t+1)=B'180(t+1), D0(t+1)=B0(t+1), D1(t+1)=B'270(t+1), and D3(t+1)=B90(t+1).

The ranging operation processing unit 15 configured as described above may calculate depth from four detection signals detected by irradiated light having a phase delay of 0° and irradiated light having a phase delay of 90° or calculate depth from four detection signals detected by irradiated light having a phase delay of 180° and irradiated light having a phase delay of 270°. Accordingly, compared with, for example, a case in which depth is calculated from eight detection signals as in the related art, a frame rate may be doubled.

Further, the ranging operation processing unit 15 desirably needs to emit irradiated light only twice when a frame rate is not increased. Therefore, compared with a case in which irradiated light is emitted four times as in the related art, the ranging operation processing unit 15 may reduce power consumption. In addition, the ranging operation processing unit 15 may reduce the number of detection signals desirably detected to output one depth frame by half over the related art. Therefore, the ranging operation processing unit 15 may narrow a data transfer band.

Accordingly, the ranging module 11 including the ranging operation processing unit 15 is allowed to improve its performance over the related art.

(First Processing Example of Ranging Operation Processing)

Figure 13:
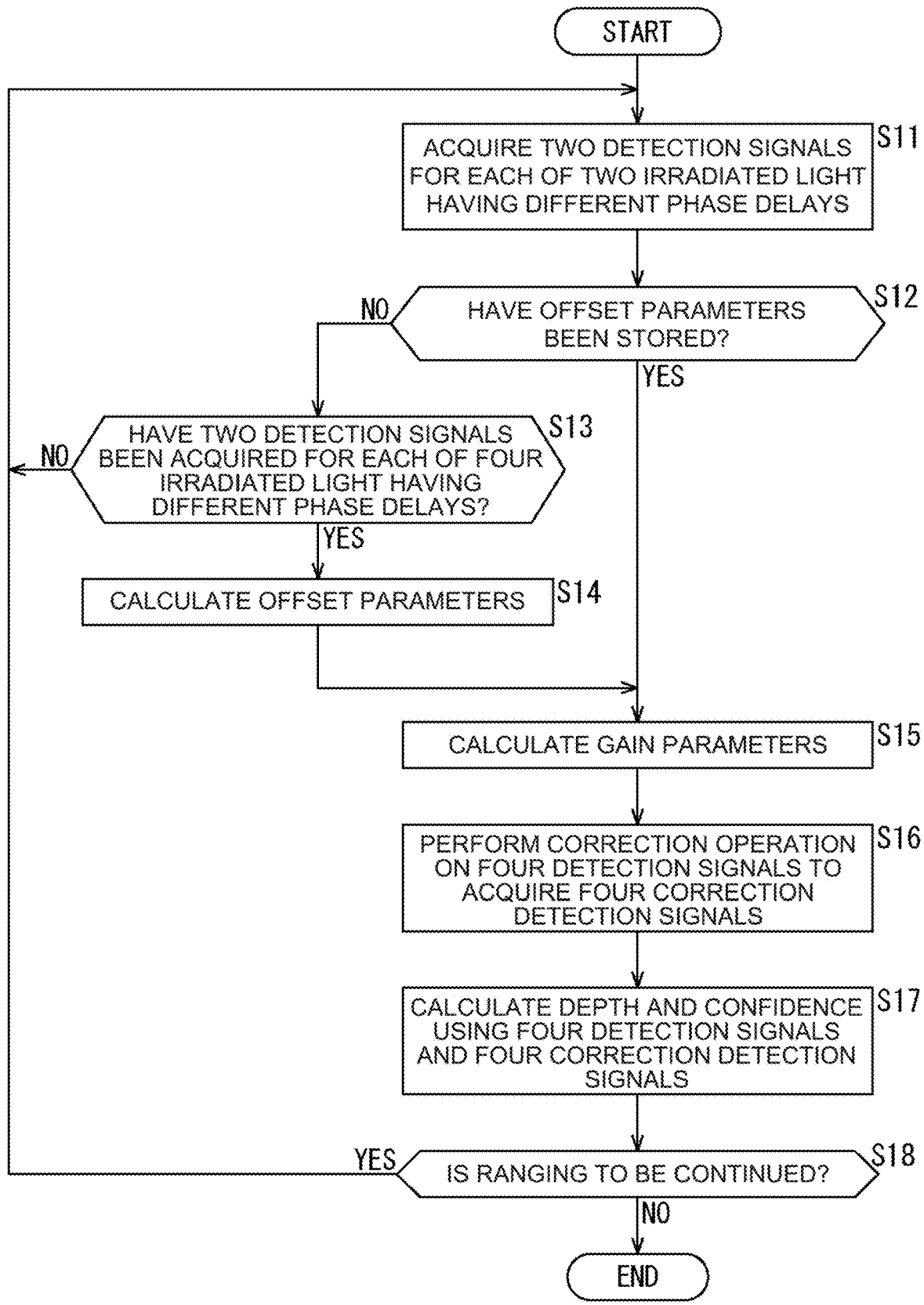
FIG. 13 is a flowchart for describing a first processing example of ranging operation processing.

FIG. 13 is a flowchart for describing a first processing example of ranging operation processing performed by the ranging operation processing unit 15.

For example, the ranging operation processing is started when the ranging operation processing unit 15 is controlled to perform the ranging operation processing by a higher-order control unit not shown. In step S11, the ranging operation processing unit 15 acquires two detection signals for each of two irradiated light having different phase delays. That is, the ranging operation processing unit 15 acquires, for example, two detection signals A0 and B0 detected by irradiated light having a phase delay of 0° and two detection signals A90 and B90 detected by irradiated light having a phase delay of 90°. Alternatively, the ranging operation processing unit 15 acquires, for example, two detection signals A180 and B180 detected by irradiated light having a phase delay of 180° and two detection signals A270 and B270 detected by irradiated light having a phase delay of 270°.

In step S12, the difference correction parameter calculation unit 61 determines whether offset parameters (Offset_A and Offset_B) have been stored in the difference correction parameter storage unit 62.

When the difference correction parameter calculation unit 61 determines in step S12 that the offset parameters (Offset_A and Offset_B) have not been stored in the difference correction parameter storage unit 62, the processing proceeds to step S13.

In step S13, the difference correction parameter calculation unit 61 determines whether two detection signals have been acquired for each of four irradiated light having different phase delays desirably used to calculate the offset parameters (Offset_A and Offset_B). For example, when having acquired the eight detection signals of detection signals A0 to A270 and detection signals B0 to B270, the difference correction parameter calculation unit 61 determines that the two detection signals have been acquired for each of four irradiated light having different phase delays.

When the difference correction parameter calculation unit 61 determines in step S13 that the two detection signals have not been acquired for each of four irradiated light having different phase delays, the processing returns to step S11. In this case, detection signals A0 and A90 and detection signals B0 and B90 have been, for example, acquired. Thus, the difference correction parameter calculation unit 61 acquires detection signals A180 and A270 and detection signals B180 and B270 in the next step S11.

On the other hand, when the difference correction parameter calculation unit 61 determines in step S13 that the two detection signals have been acquired for each of the four irradiated light having the different phase delays, the processing proceeds to step S14.

In step S14, the difference correction parameter calculation unit 61 solves the simultaneous equation shown in the above Formula (3) to calculate offsets Offset_A and Offset_B.

Then, after the difference correction parameter calculation unit 61 stores the offsets Offset_A and Offset_B in the difference correction parameter storage unit 62, the processing proceeds to step S15. On the other hand, when the difference correction parameter calculation unit 61 determines in step S12 that the offset parameters (Offset_A and Offset_B) have been stored in the difference correction parameter storage unit 62, the processing proceeds to step S15.

In step S15, the difference correction parameter calculation unit 61 calculates gain parameters (Gain_A and Gain_B) according to the above Formula (4) or (5). Then, the difference correction parameter calculation unit 61 supplies the calculated gain parameters (Gain_A and Gain_B) to the correction operation unit 71, and the difference correction parameter storage unit 62 supplies the stored offset parameters (Offset_A and Offset_B) to the correction operation unit 71.

In step S16, the correction operation unit 71 performs a correction operation on the four detection signals acquired in step S11 to acquire four correction detection signals and supplies the acquired four correction detection signals to the ranging operation unit 72.

For example, when the detection signals A0 and A90 and the detection signals B0 and B90 have been acquired in step S11, the correction operation unit 71 performs a correction operation according to the above Formula (6) to acquire correction detection signals A'180 and A'270 and correction detection signals B'180 and B'270. Further, when the detection signals A180 and A270 and the detection signals B180 and B270 have been acquired in step S11, the correction operation unit 71 performs a correction operation according to the above Formula (7) to acquire correction detection signals A'0 and A'90 and correction detection signals B'0 and B'90.

In step S17, the ranging operation unit 72 calculates depth and confidence using the four detection signals acquired in step S11 and the four correction detection signals acquired by the correction operation in step S16.

For example, it is assumed that the detection signals A0 and A90 and the detection signals B0 and B90 have been acquired in step S11, and that the correction detection signals A'180 and A'270 and the correction detection signals B'180 and B'270 have been acquired in step S16. At this time, the ranging operation unit 72 performs an operation shown in the above Formula (13) to calculate depth and confidence. Further, it is assumed that the detection signals A180 and A270 and the detection signals B180 and B270 have been acquired in step S11, and that the correction detection signals A'0 and A'90 and the correction detection signals B'0 and B'90 have been acquired in step S16. At this time, the ranging operation unit 72 performs an operation shown in the above Formula (14) to calculate depth and confidence.

In step S18, the ranging operation processing unit 15 determines whether the ranging is to be continued according to the control of the ranging operation processing by the higher-order control unit not shown.

When the ranging operation processing unit 15 determines in step S18 that the ranging is to be continued, the processing returns to step S11 to repeatedly perform the same processing. On the other hand, when the ranging operation processing unit 15 determines in step S18 that the ranging is not to be continued, the ranging operation processing is ended.

As described above, the ranging operation processing unit 15 may acquire the detection signals A0 and A90 and the detection signals B0 and B90 or acquire the detection signals A180 and A270 and the detection signals B180 and B270 to calculate depth and confidence. Accordingly, the ranging operation processing unit 15 is allowed to reduce a time desirably used to detect detection signals for calculating depth and confidence and improve robustness.

(Second Configuration Example of Ranging Operation Processing Unit)

Figure 14:
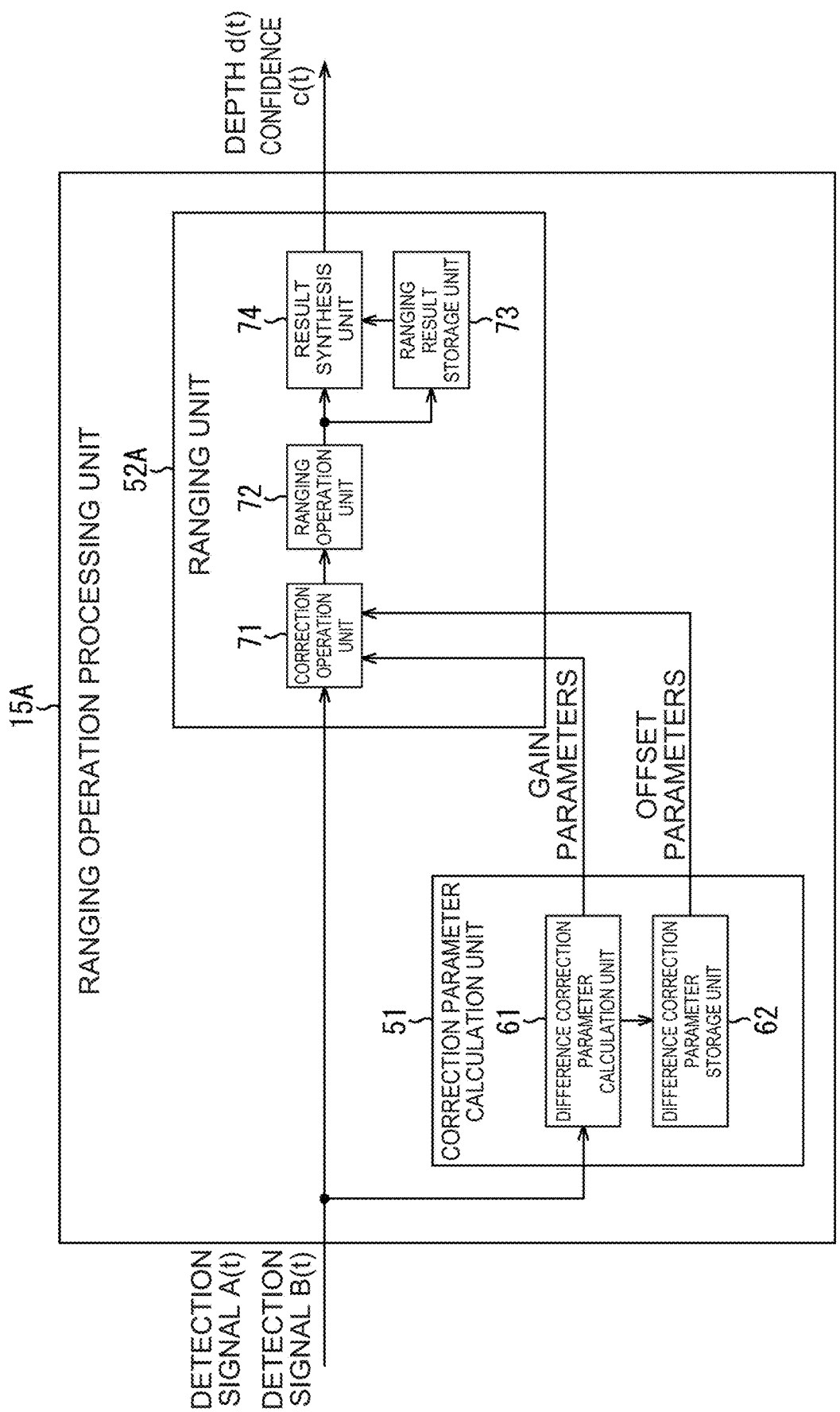
FIG. 14 is a block diagram showing a second configuration example of the ranging operation processing unit.

FIG. 14 is a block diagram showing a second configuration example of the ranging operation processing unit 15. Note that in a ranging operation processing unit 15A shown in FIG. 14, the same constituents as those of the ranging operation processing unit 15 of FIG. 12 will be denoted by the same symbols and their detailed descriptions will be omitted.

That is, the ranging operation processing unit 15A includes a correction parameter calculation unit 51 and a ranging unit 52A. Like the ranging operation processing unit 15 of FIG. 12, the correction parameter calculation unit 51 has a difference correction parameter calculation unit 61 and a difference correction parameter storage unit 62.

The ranging unit 52A has a correction operation unit 71 and a ranging operation unit 72 like the ranging operation processing unit 15 of FIG. 12 but is different from the ranging unit 52 of the ranging operation processing unit 15 of FIG. 12 in that the ranging unit 52A has a ranging result storage unit 73 and a result synthesis unit 74.

Further, the ranging unit 52A is configured such that depth d(t) and confidence c(t) calculated by the ranging operation unit 72 as described above are supplied to the ranging result storage unit 73 and the result synthesis unit 74 as ranging results. Further, the ranging unit 52A is configured such that the ranging results of a previous frame, i.e., depth d(t−1) and confidence c(t−1) are supplied from the ranging result storage unit 73 to the result synthesis unit 74.

The ranging result storage unit 73 is allowed to store the depth d(t) and the confidence c(t) supplied from the ranging operation unit 72 only for one frame and supplies the depth d(t−1) and the confidence c(c−1) of the previous frame to the result synthesis unit 74.

The result synthesis unit 74 synthesizes the depth d(t) and the confidence c(t) supplied from the ranging operation unit 72 and the depth d(t−1) and the confidence c(t−1) supplied from the ranging result storage unit 73 together and outputs depth d(t) and confidence c(t) calculated as their synthesis results.

Here, it is assumed that the depth d(t) and the confidence c(t) supplied from the ranging operation unit 72 to the ranging result storage unit 73 and the result synthesis unit 74 are depth d' (t) and confidence c' (t), respectively, and that the synthesis results of the result synthesis unit 74 are depth d(t) and confidence c(t). In this case, the result synthesis unit 74 may synthesize the ranging results together according to a weighting operation as shown in the following Formula (15) using a weight g based on the confidence c' (t).

(Formula 15)

$$\begin{cases} d(t) = g \times d'(t) + (1-g) \times d'(t-1) \\ c(t) = g \times c'(t) + (1-g) \times c'(t-1) \end{cases} \quad (15)$$

$$g = \frac{c'(t)}{c'(t) + c'(t-1)}$$

Thus, the ranging operation processing unit 15A may synthesize the ranging results of a current frame and the ranging results of a previous frame together (hereinafter also called sliding window) to improve a SN (Signal-to-Noise) ratio and achieve a reduction in the noise of a synthesis result.

For example, when detection periods Q0 to Q3 are the same as those of a case in which the sliding window is not performed, ranging results by four detection signals detected in two detection periods Q0 and Q1 have a reduced SN ratio compared with ranging results by eight detection signals detected in the four detection periods Q0 to Q3. Therefore, the ranging operation processing unit 15A performs the sliding window to synthesize the ranging results together using the eight detection signals including the ranging results of a previous frame. Therefore, the ranging operation processing unit 15A may prevent a reduction in the SN ratio.

Further, even if a detection period in one depth frame is reduced, the ranging operation processing unit 15A may perform the sliding window to achieve an increase in SN ratio (frame×SNR/power) per power desirably used to acquire detection signals in the one depth frame.

Figure 15:
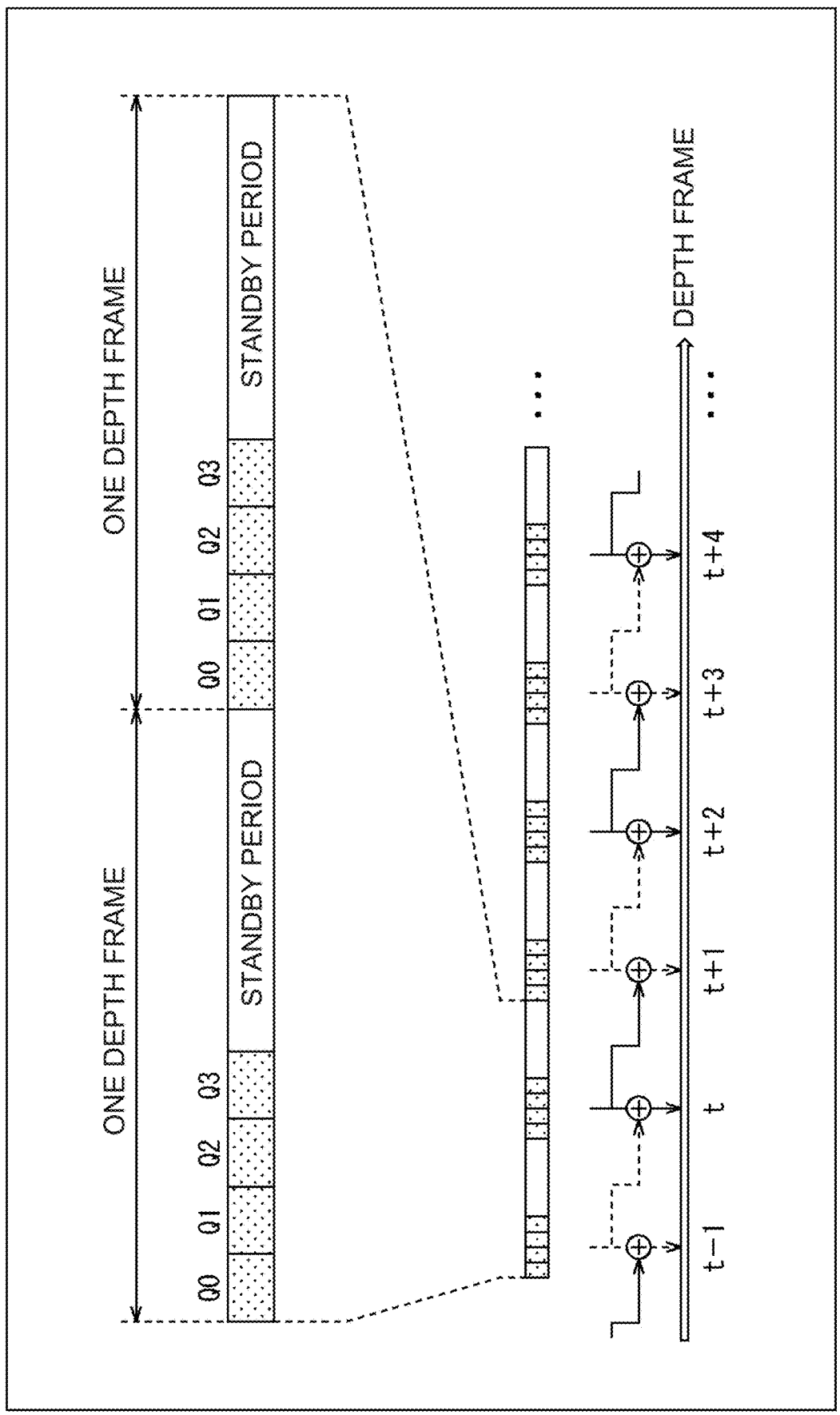
FIG. 15 is a diagram for describing an improvement in frame rate with the synthesis of ranging results.

Accordingly, since the reduction in noise is allowed by the sliding window, the ranging operation processing unit 15A may reduce the detection period Q0 to Q3 by half as shown in FIG. 15 compared with the detection period of FIG. 4. That is, the ranging operation processing unit 15A may double speed with which detection signals A and B are acquired to double a frame rate.

Here, for example, when the sliding window is not performed, the SN ratio reduces by an amount corresponding to the reduction in the detection periods Q0 to Q3 on the condition that the power desirably used to acquire the detection signals for one depth frame is not changed, and that the frame rate is doubled. On the other hand, the ranging operation processing unit 15A may perform the sliding window to avoid the reduction in SN ratio even if the frame rate is doubled without changing the power desirably used to acquire the detection signals in one depth frame.

Figure 16:
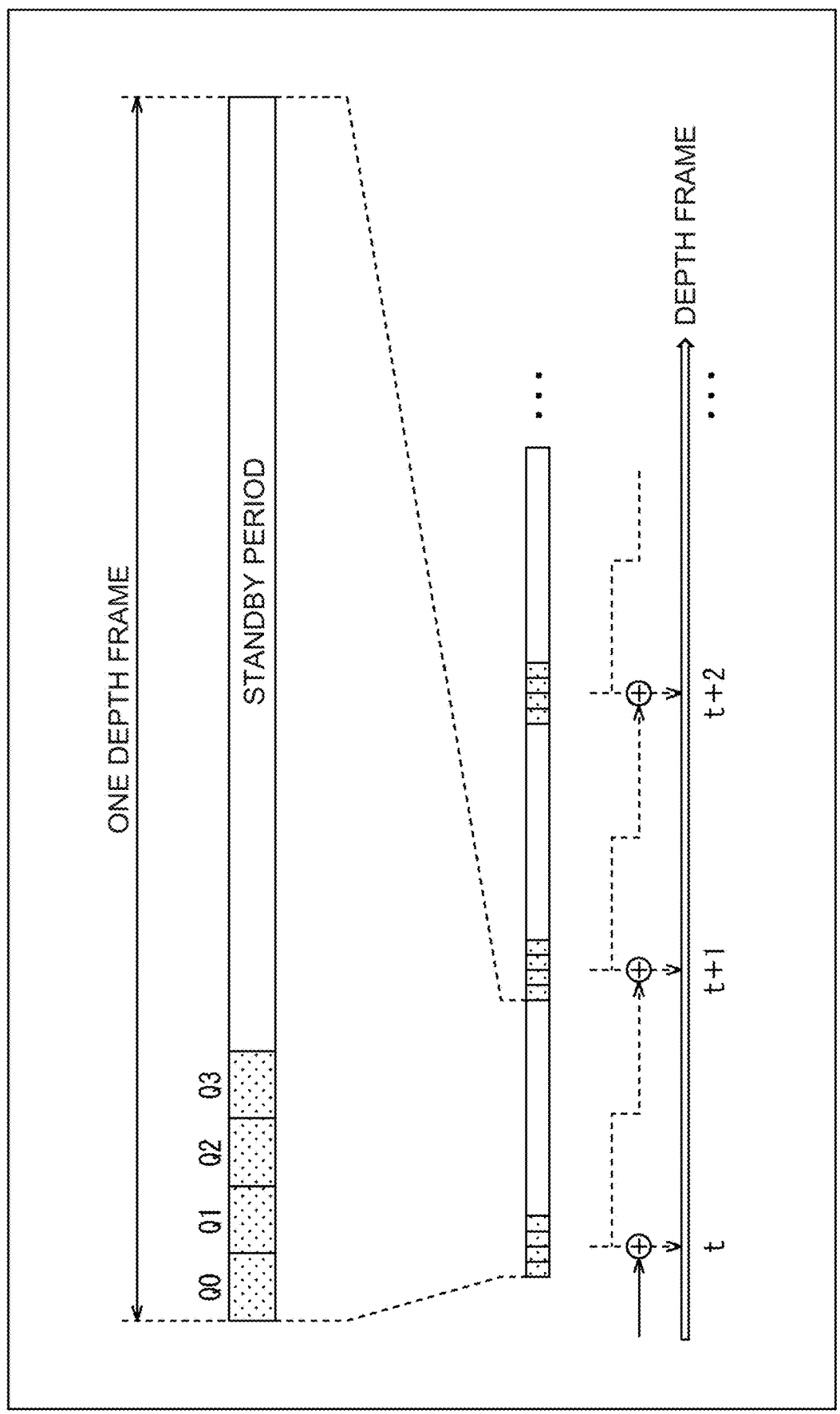
FIG. 16 is a diagram for describing a reduction in power consumption with the synthesis of ranging results.

Alternatively, as shown in FIG. 16, power desirably used to acquire detection signals in one depth frame may be reduced on the condition that a frame rate is not changed as detection periods Q0 to Q3 that are the same as those of FIG. 4, and that an SN ratio is not changed. That is, the ranging operation processing unit 15A may perform the sliding window to reduce power consumption.

Note that besides the processing of the result synthesis unit 74 in which a weighting operation based on confidence is performed to synthesize ranging results together, the ranging operation processing unit 15A may synthesize ranging results together by, for example, simple average or weighting based on a criterion other than the confidence.

In addition, for example, processing for synthesizing ranging results together by the result synthesis unit 74 may be applied to a configuration in which one depth frame is output through the four detection periods Q0 to Q3 as described above with reference to FIG. 4. That is, the application of the processing is not limited to a configuration in which one depth frame is output on the basis of the four detection signals detected in the two detection periods Q0 and Q1 or the four detection signals detected in the two detection periods Q2 and Q3.

(Second Processing Example of Ranging Operation Processing)

Figure 17:
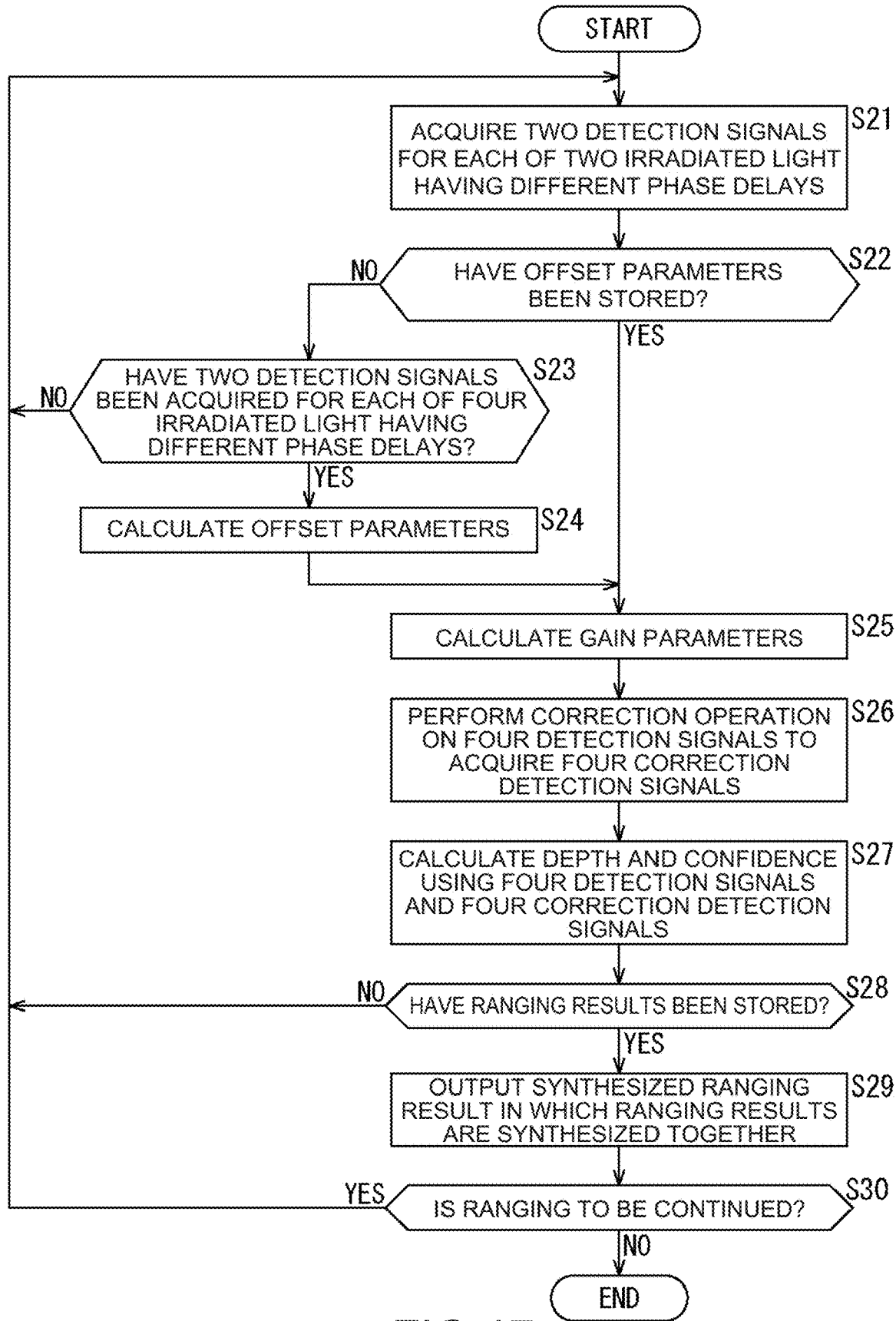
FIG. 17 is a flowchart for describing a second processing example of the ranging operation processing.

FIG. 17 is a flowchart for describing a second processing example of ranging operation processing performed by the ranging operation processing unit 15A.

In step S21 to S27, the same processing as that of steps S11 to S17 of FIG. 13 is performed.

Then, in step S27, calculated depth and confidence are supplied to the ranging result storage unit 73 and the result synthesis unit 74. The result synthesis unit 74 determines in step S28 whether ranging results have been stored in the ranging result storage unit 73.

When the result synthesis unit 74 determines in step S28 that the ranging results have not been stored in the ranging result storage unit 73, the processing returns to step S21. That is, in this case, the depth and the confidence of a previous frame have not been stored in the ranging result storage unit 73, and thus the result synthesis unit 74 does not perform processing for synthesizing the ranging results together.

On the other hand, when the result synthesis unit 74 determines in step S28 that the ranging results have been stored in the ranging result storage unit 73, the processing proceeds to step S29.

In step S29, the result synthesis unit 74 reads out the depth and the confidence of the previous frame from the ranging result storage unit 73. Then, the result synthesis unit 74 performs the weighting operation of the depth and the confidence supplied in step S27 and the depth and the confidence of the previous frame read out from the ranging result storage unit 73 according to the confidence to output a synthesized ranging result in which the measurement results are synthesized together.

Then, the same processing as that of step S18 of FIG. 13 is performed in step S30. When it is determined that the ranging is not to be continued, the ranging operation processing is ended.

As described above, the ranging operation processing unit 15A may synthesize measurement results together according to a weighting operation based on confidence to reduce the SN ratio of the measurement results and perform ranging more accurately. Further, the ranging operation processing unit 15A may improve a frame rate (see FIG. 15) or reduce power consumption (see FIG. 16).

(Actions of Light Emission Unit and Light Reception Unit)

The actions of the light emission unit 12 and the light reception unit 14 will be described with reference to FIGS. 18 to 21

Figure 18:
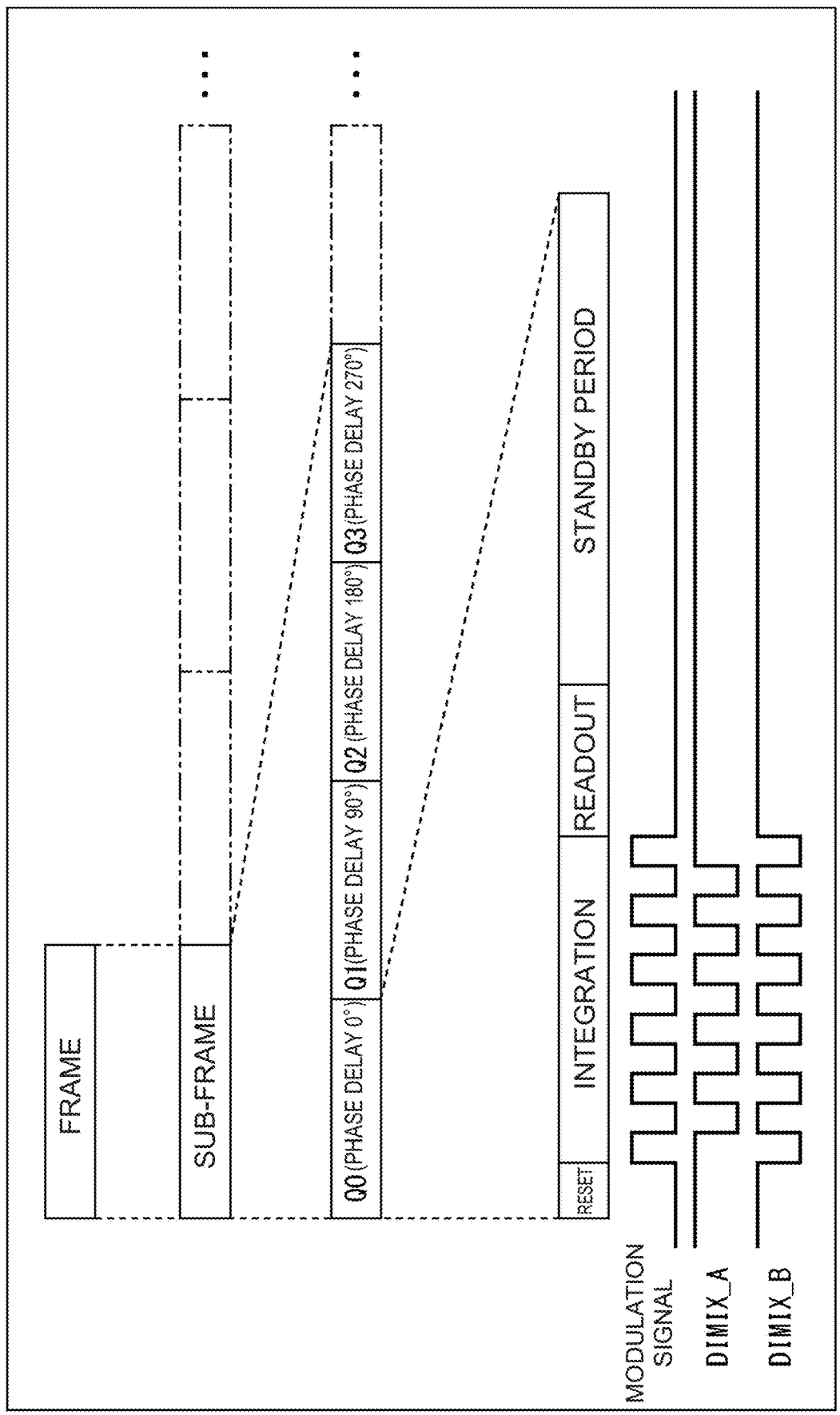
FIG. 18 is a diagram showing an example of timing at which light is emitted and received to output one depth map.

FIG. 18 shows an example of timing at which light is emitted and received to output one depth map.

For example, the ranging module 11 may set one frame for outputting a depth map as one sub-frame, and the one sub-frame is divided into four, i.e., detection periods Q0, Q1, Q2, and Q3. Further, in the integration period of each of the detection periods Q0, Q1, Q2, and Q3, the light emission unit 12 emits irradiated light at timing corresponding to a modulated signal, and the light reception unit 14 receives reflected light generated from the irradiated light. As described with reference to FIG. 1, charges generated by one photodiode 31 are distributed to the taps 32A and 32B according to the distribution signals DMIX_A and DMIX_B and accumulated by the amount of the light received in the integration period.

Here, in the above example shown in FIG. 4, the standby period corresponding to one depth frame is provided after the detection periods Q0, Q1, Q2, and Q3. On the other hand, in the example shown in FIG. 18, a standby period divided into four is provided after each of the detection periods Q0, Q1, Q2, and Q3.

Thus, with the provision of the standby period after each of the detection periods Q0, Q1, Q2, and Q3, the interval between the respective integration periods may be made uniform.

Figure 19:
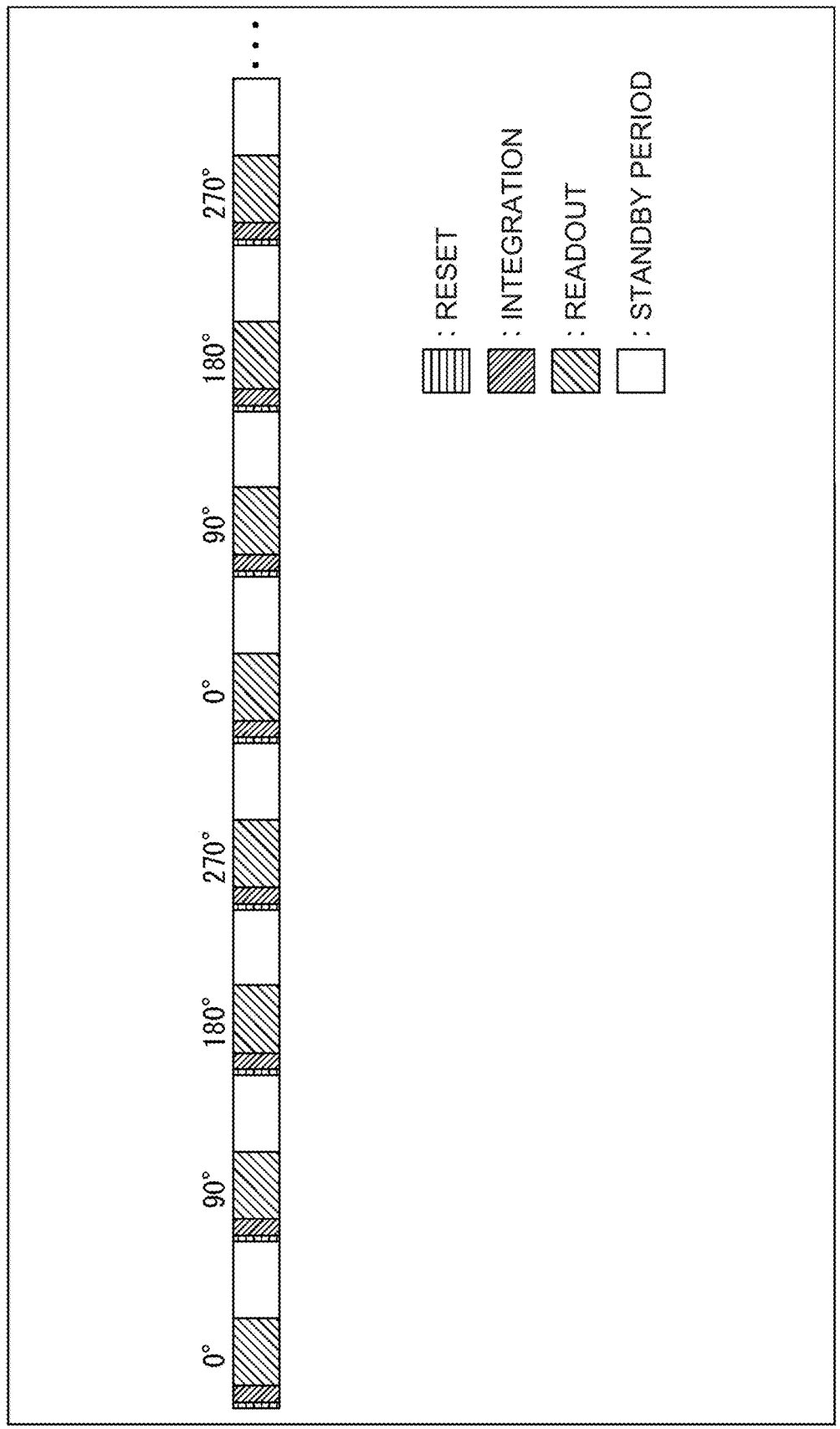
FIG. 19 is a diagram showing a light emission pattern variation.

That is, as shown in FIG. 19, the light emission timing of irradiated light having a phase delay of 0°, the light emission timing of irradiated light having a phase delay of 90°, the light emission timing of irradiated light having a phase delay of 180°, and the light emission timing of irradiated light having a phase delay of 270° are uniformly set. Thus, with the employment of light emission timing set at uniform intervals, an adverse effect due to their different intervals may be prevented, for example, when the ranging operation processing unit 15A performs the sliding window.

Figure 20:
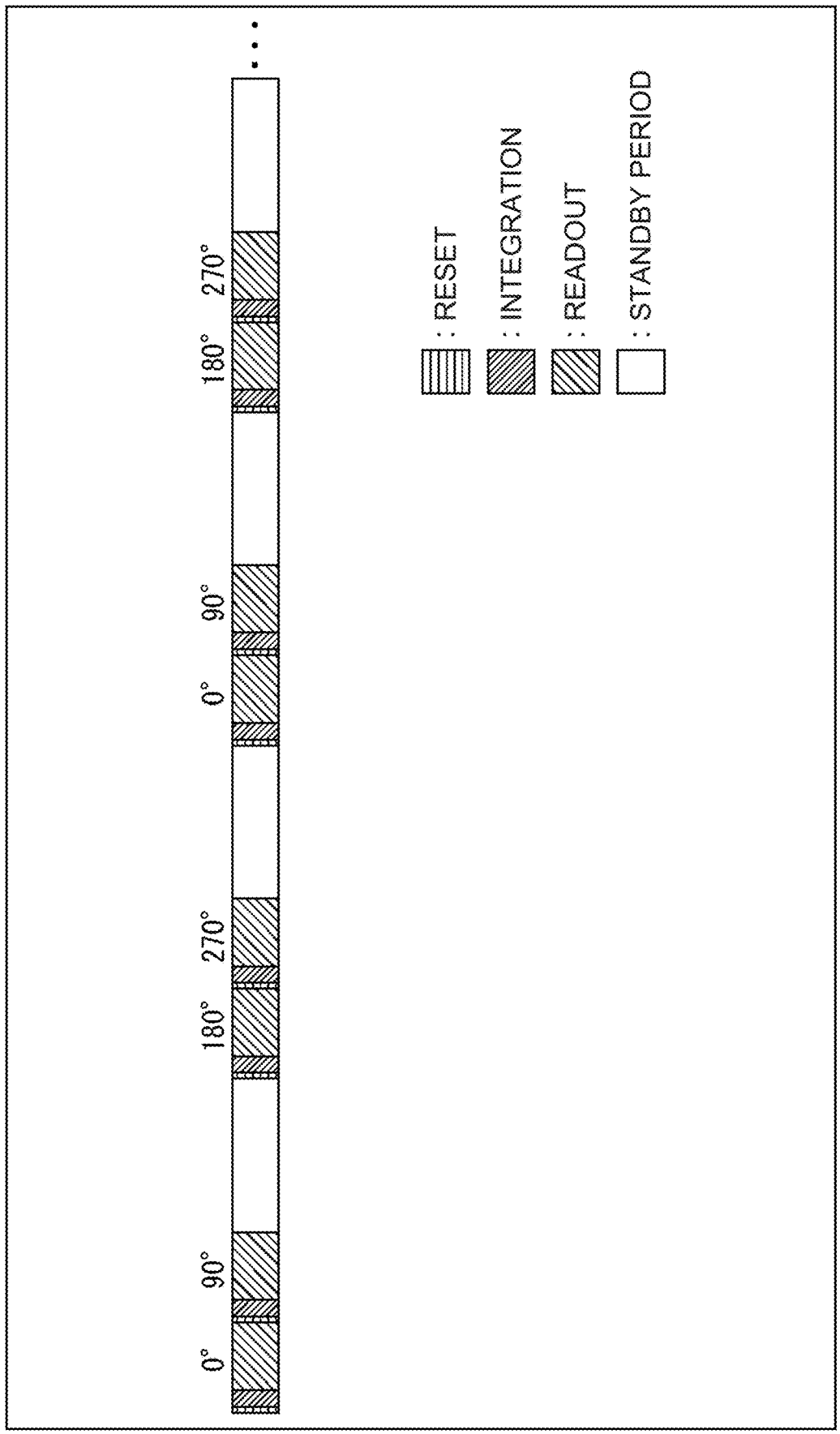
FIG. 20 is a diagram showing a light emission pattern variation.

Further, light emission timing as shown in FIG. 20 may be employed. As described above, the ranging operation processing unit 15 acquires one depth frame from four detection signals A0, B0, A90, and B90 and acquires one depth frame from four detection signals A180, B180, A270, and B270.

Accordingly, as shown in FIG. 20, the light emission timing of irradiated light having a phase delay of 0° and the light emission timing of irradiated light having a phase delay of 90° for acquiring one depth frame are desirably approximated to each other, and the light emission timing of irradiated light having a phase delay of 180° and the light emission timing of irradiated light having a phase delay of 270° for acquiring a next depth frame are desirably approximated to each other. For example, with the approximation of light emission timing for acquiring one depth frame, an effect due to separated light emission timing may be prevented by the motion of an object when the object is in motion.

Further, with the interval between light emission timing for acquiring one depth frame and light emission timing for acquiring a next depth frame made uniform, an adverse effect due to their different intervals may be prevented when the ranging operation processing unit 15A performs the sliding window.

Figure 21:
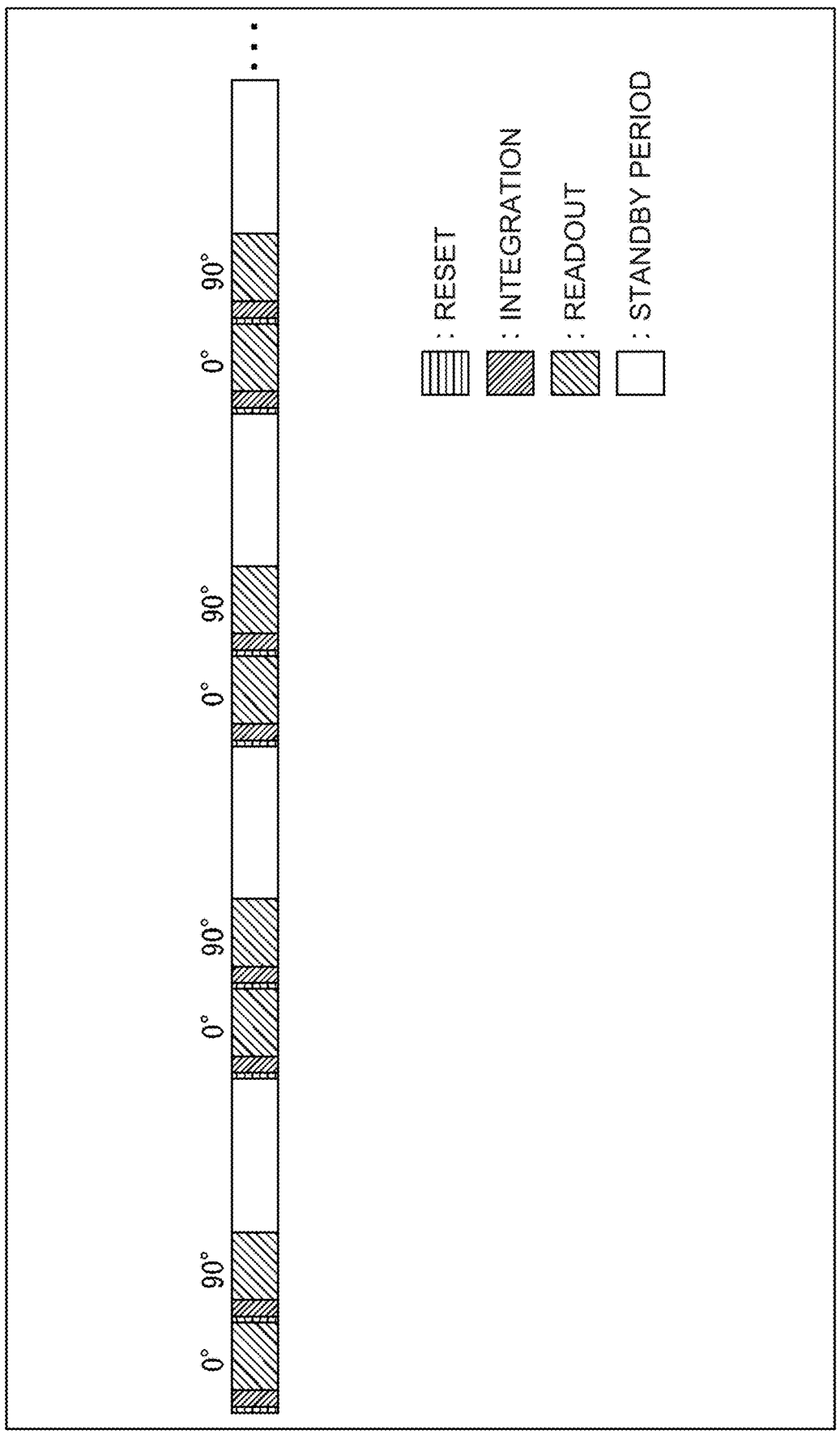
FIG. 21 is a diagram showing a light emission pattern variation.

Further, light emission timing as shown in FIG. 21 may be employed. That is, the ranging operation processing unit 15 may acquire a depth frame using only irradiated light having a phase delay of 0° and irradiated light having a phase delay of 90°, provided that offsets Offset_A and Offset_B are calculated in advance.

Note that the light emission timing of the light emission unit 12 is not limited to the examples shown in FIGS. 18 to 21, and various other light emission timing may be employed.

(Third Configuration Example of Ranging Operation Processing Unit)

Figure 22:
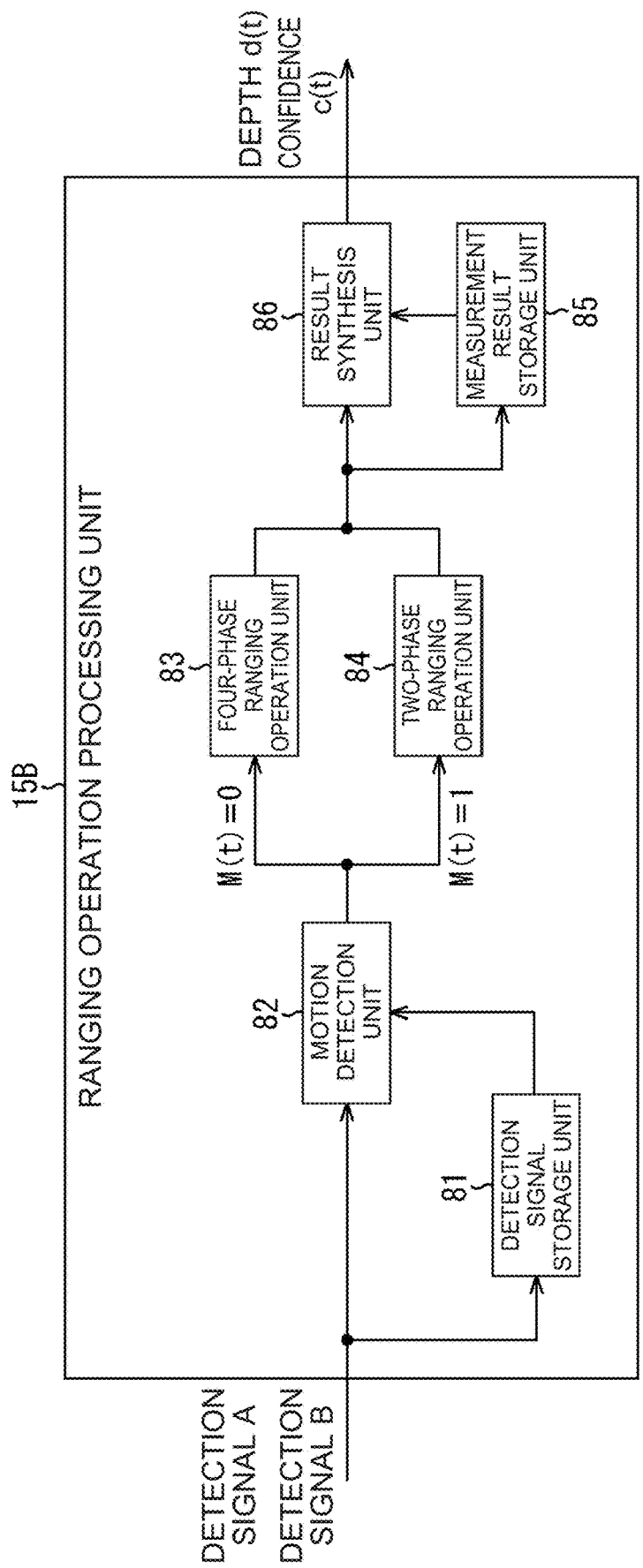
FIG. 22 is a block diagram showing a third configuration example of the ranging operation processing unit.

FIG. 22 is a block diagram showing a third configuration example of the ranging operation processing unit 15.

A ranging operation processing unit 15B shown in FIG. 22 includes a detection signal storage unit 81, a motion detection unit 82, a four-phase ranging operation unit 83, a two-phase ranging operation unit 84, a ranging result storage unit 85, and a result synthesis unit 86.

Further, like the case described with reference to FIG. 12, the ranging operation processing unit 15B receives four detection signals detected by irradiated light having a phase delay of 0° and irradiated light having a phase delay of 90° and receives four detection signals detected by irradiated light having a phase delay of 180° and irradiated light having a phase delay of 270°. That is, the ranging operation processing unit 15B receives detection signals $A0(t)$, $B0(t)$, $A90(t)$, and $B90(t)$ and subsequently receives detection signals $A180(t+1)$, $B180(t+1)$, $A270(t+1)$, and $B270(t+1)$.

The detection signal storage unit 81 is capable of storing four detection signals. Every time the detection signal storage unit 81 receives four detection signals, the detection signal storage unit 81 supplies four previous detection signals to the motion detection unit 82.

That is, the detection signal storage unit 81 has stored detection signals $A180(t-1)$, $B180(t-1)$, $A270(t-1)$, and $B270(t-1)$ at timing at which the detection signal storage unit 81 receives the detection signals $A0(t)$, $B0(t)$, $A90(t)$, and $B90(t)$, and thus supplies the detection signals that have been stored to the motion detection unit 82. Further, the detection signal storage unit 81 has stored the detection signals $A0(t)$, $B0(t)$, $A90(t)$, and $B90(t1)$ at timing at which the detection signal storage unit 81 receives the detection signals $A180(t+1)$, $B180(t+1)$, $A270(t+1)$, and $B270(t+1)$, and thus supplies the detection signals that have been stored to the motion detection unit 82.

The motion detection unit 82 detects the motion of a subject for each of the pixels of the light reception unit 14, and determines whether the subject in motion has been reflected on the basis of a prescribed threshold th.

That is, the motion detection unit 82 makes determination according to a determination condition shown in the following Formula (16) at timing at which the motion detection unit 82 receives the detection signals $A0(t)$, $B0(t)$, $A90(t)$, and $B90(t)$.

(Formula 16)

$$\begin{cases} |A0(t) + A180(t-1) - \{A90(t) + A270(t-1)\}| < th \\ |B0(t) + B180(t-1) - \{B90(t) + B270(t-1)\}| < th \end{cases} \quad (16)$$

For example, when the determination condition of the above Formula (16) is satisfied, the motion detection unit 82 determines that the subject in motion has not been reflected in a depth frame acquired on the basis of the detection signals $A0(t)$, $B0(t)$, $A90(t)$, and $B90(t)$. In this case, the motion detection unit 82 outputs a motion-subject detection signal $M(t)=0$ indicating that the subject in motion has not been reflected, and supplies the detection signals $A0(t)$, $B0(t)$, $A90(t)$, and $B90(t)$ to the four-phase ranging operation unit 83. In this case, the motion detection unit 82 also supplies the detection signals $A180(t-1)$, $B180(t-1)$, $A270(t-1)$, and $B270(t-1)$ supplied from the detection signal storage unit 81 to the four-phase ranging operation unit 83.

On the other hand, when the determination condition of the above Formula (16) is not satisfied, the motion detection unit 82 determines that the subject in motion has been reflected in the depth frame acquired on the basis of the detection signals $A0(t)$, $B0(t)$, $A90(t)$, and $B90(t)$. In this case, the motion detection unit 82 outputs a motion-subject detection signal $M(t)=1$ indicating that the subject in motion has been reflected, and supplies the detection signals A0(*t*), B0(*t*), A90(*t*), and B90(*t*) to the two-phase ranging operation unit 84.

Similarly, the motion detection unit 82 makes determination based on a determination condition shown in the following Formula (17) at timing at which the motion detection unit 82 receives the detection signals A180(*t*+1), B180(*t*+1), A270(*t*+1), and B270(*t*+1).

(Formula 17)

$$\begin{cases} |A180(t+1) + A0(t) - \{A270(t+1) + A90(t)\}| < th \\ |B180(t+1) + B0(t) - \{B270(t+1) + B90(t)\}| < th \end{cases} \quad (17)$$

For example, when the determination condition of the above Formula (17) is satisfied, the motion detection unit 82 determines that the subject in motion has not been reflected in a depth frame acquired on the basis of the detection signals A180(*t*+1), B180(*t*+1), A270(*t*+1), and B270(*t*+1). In this case, the motion detection unit 82 outputs the motion-subject detection signal M(t)=0 indicating that the subject in motion has not been reflected, and supplies the detection signals A180(*t*+1), B180(*t*+1), A270(*t*+1), and B270(*t*+1) to the four-phase ranging operation unit 83. In this case, the motion detection unit 82 also supplies the detection signals A0(*t*), B0(*t*), A90(*t*), and B90(*t*) supplied from the detection signal storage unit 81 to the four-phase ranging operation unit 83.

On the other hand, when the determination condition of the above Formula (17) is not satisfied, the motion detection unit 82 determines that the subject in motion has been reflected in the depth frame acquired on the basis of the detection signals A180(*t*+1), B180(*t*+1), A270(*t*+1), and B270(*t*+1). In this case, the motion detection unit 82 outputs the motion-subject detection signal M(t)=1 indicating that the subject in motion has been reflected, and supplies the detection signals A180(*t*+1), B180(*t*+1), A270(*t*+1), and B270(*t*+1) to the two-phase ranging operation unit 84.

When it is determined by the motion detection unit 82 that the motion subject has not been reflected, the four-phase ranging operation unit 83 performs processing (hereinafter called four-phase ranging operation processing) for performing ranging by an operation using the eight detection signals detected by the irradiated light having a phase delay of 0°, the irradiated light having a phase delay of 90°, the irradiated light having a phase delay of 180°, and the irradiated light having a phase delay of 270°.

For example, in this case, the motion detection unit 82 supplies the detection signals A180(*t*−1), B180(*t*−1), A270(*t*−1), B270(*t*−1), A0(*t*), B0(*t*), A90(*t*), and B90(*t*) to the four-phase ranging operation unit 83.

Accordingly, the four-phase ranging operation unit 83 performs an operation according to the following Formula (18) to calculate depth d(t) and confidence c(t) and supplies the calculated depth d(t) and the confidence c(t) to the ranging result storage unit 85 and the result synthesis unit 86.

(Formula 18)

$$\begin{cases} d(t) = \dfrac{c}{4\pi f} \tan^{-1}\left(\dfrac{D1(t) - D3(t)}{D0(t) - D2(t)}\right) \\ c(t) = \sqrt{I(t)^2 + Q(t)^2} \end{cases} \quad (18)$$

-continued $$Q(t) = D1(t) - D3(t)$$
$$I(t) = D0(t) - D2(t)$$
$$D0(t) = A0(t) - B0(t)$$
$$D1(t) = A90(t) - B90(t)$$
$$D2(t) = A180(t-1) - B180(t-1)$$
$$D3(t) = A270(t-1) - B270(t-1)$$

Similarly, the four-phase ranging operation unit 83 may calculate depth d(t+1) and confidence c(t+1) using the detection signals A0(*t*), B0(*t*), A90(*t*), B90(*t*), A180(*t*+1), B180(*t*+1), A270(*t*+1), and B270(*t*+1).

The two-phase ranging operation unit 84 has the same functions as those of the ranging operation processing unit 15 of FIG. 12 and includes a correction parameter calculation unit 51 and a ranging unit 52 shown in FIG. 12.

That is, when it is determined by the motion detection unit 82 that the motion subject has been reflected, the two-phase ranging operation unit 84 performs processing (hereinafter called two-phase ranging operation processing) for performing ranging by an operation using the four detection signals detected by the irradiated light having a phase delay of 0° and the irradiated light having a phase delay of 90° or the four detection signals detected by the irradiated light having a phase delay of 180° and the irradiated light having a phase delay of 270°. Then, the two-phase ranging operation unit 84 supplies depth d(t) and confidence c(t) calculated by the two-phase ranging operation processing to the ranging result storage unit 85 and the result synthesis unit 86.

The ranging result storage unit 85 and the result synthesis unit 86 have the same functions as those of the ranging result storage unit 73 and the result synthesis unit 74 of FIG. 14. That is, the ranging result storage unit 85 may supply the ranging results of a previous frame to the result synthesis unit 74, and the result analysis unit 86 may synthesize the ranging results of a current frame and the ranging results of the previous frame together.

Figure 23:
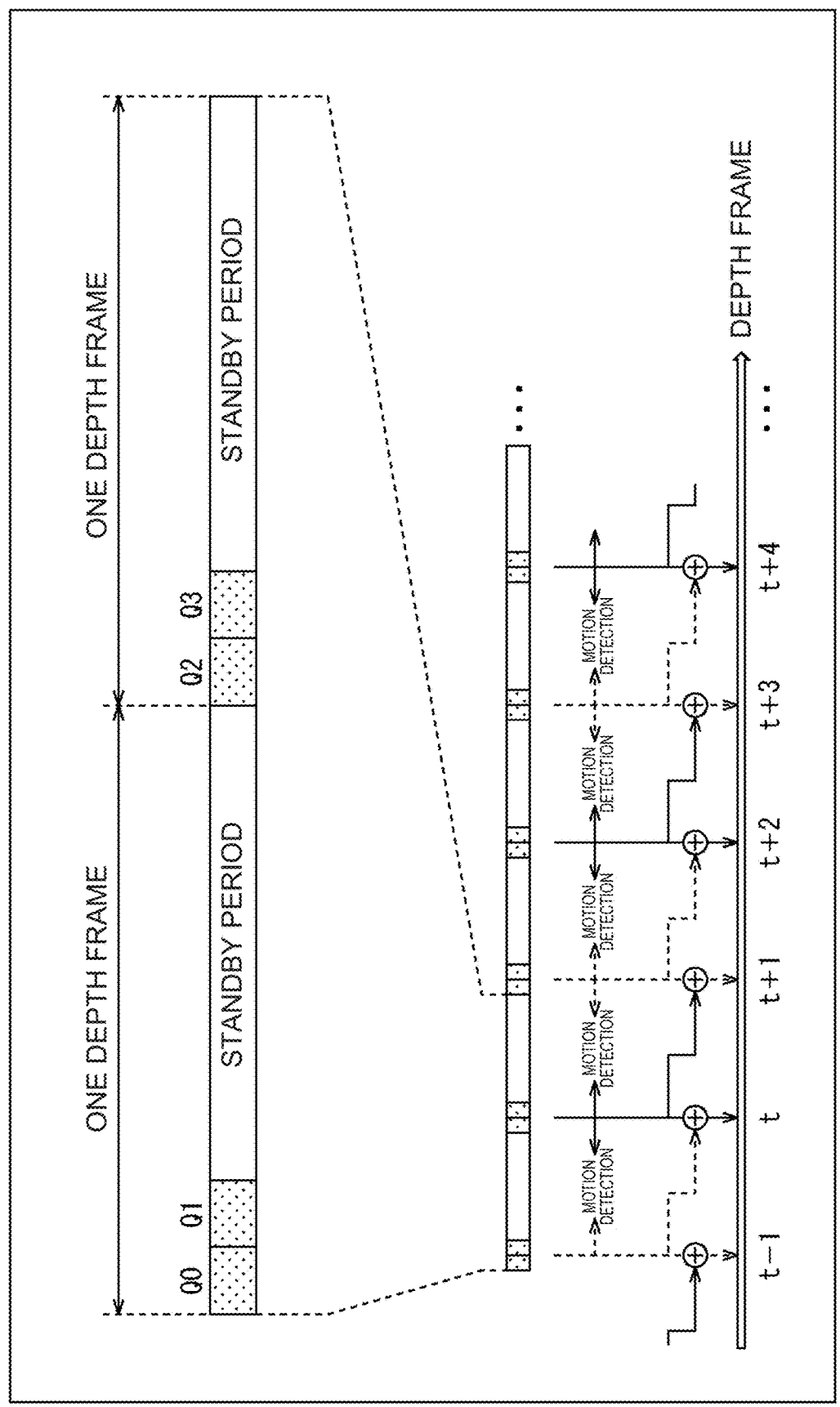
FIG. 23 is a diagram for describing the synthesis of ranging results based on motion detection.

As shown in FIG. 23, the ranging operation processing unit 15B thus configured may synthesize two sequential depth frames together according to a motion detection result for each frame to be output as one depth frame.

For example, when motion detection with the ranging results of previous frame number t−1 before being synthesized with ranging results shows that a motion subject has been reflected at timing at which the depth frame of frame number t is output, the ranging operation processing unit 15B directly outputs the ranging results of the frame number t as a depth frame. On the other hand, when the motion detection with the depth frame of the previous frame number t−1 before being synthesized with the ranging results shows that the motion subject has not been reflected at the timing at which the depth frame of the frame number t is output, the ranging operation processing unit 15B outputs a synthesized ranging result obtained by being synthesized with the ranging results of the frame number t−1 as the depth frame of the frame number t.

As described above, the ranging operation processing unit 15B may switch between the four-phase ranging operation processing and the two-phase ranging operation processing according to a motion detection result. Accordingly, for example, when a motion subject has been reflected, the ranging operation processing unit 15B may perform the two-phase ranging operation processing to calculate a depth frame at a higher frame rate and improve measurement accuracy with respect to the motion subject. Thus, the ranging operation processing unit 15B is allowed to improve robustness with respect to a motion subject. Further, when a motion subject has not been reflected, the ranging operation processing unit 15B may perform the four-phase ranging operation processing to further reduce noise.

(Third Processing Example of Ranging Operation Processing)

Figure 24:
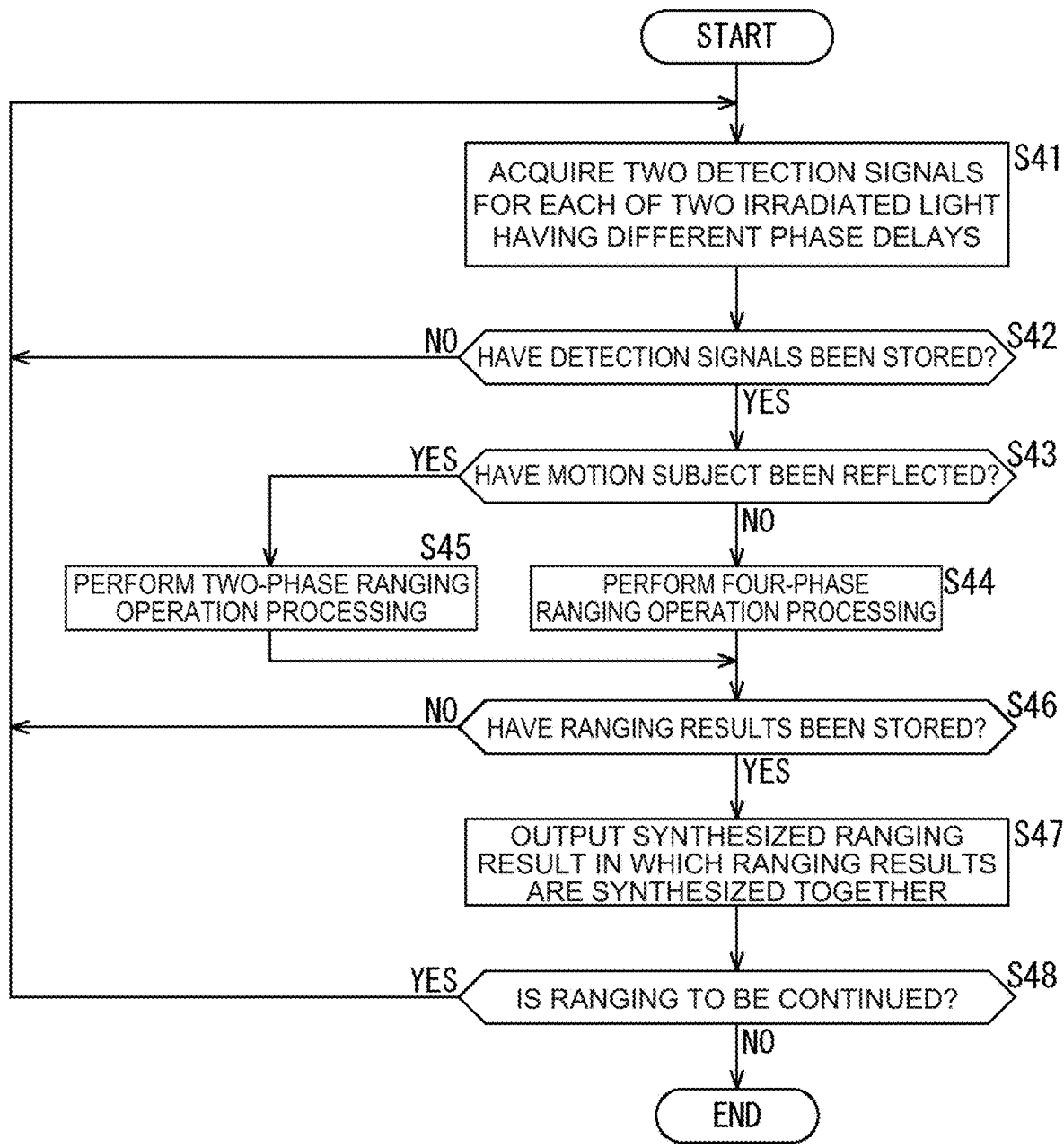
FIG. 24 is a flowchart for describing a third processing example of the ranging operation processing.

FIG. 24 is a flowchart for describing a third processing example of ranging operation processing performed by the ranging operation processing unit 15B.

In step S41, the same processing as that of step S11 of FIG. 13 is performed. That is, the ranging operation processing unit 15B acquires two detection signals for each of two irradiated light having different phase delays.

In step S41, the motion detection unit 82 determines whether detection signals have been stored in the detection signal storage unit 81.

When the motion detection unit 82 determines in step S41 that the detection signals have not been stored in the detection signal storage unit 81, the processing returns to step S41. That is, the detection signals of a previous frame have not been stored in the detection signal storage unit 81, and thus the motion detection unit 82 does not perform processing for detecting motion.

On the other hand, when the motion detection unit 82 determines in step S42 that the detection signals have been stored in the detection signal storage unit 81, the processing proceeds to step S43. In step S43, the motion detection unit 82 determines whether a motion subject has been reflected according to the determination condition shown in the above Formula (16) or (17).

When the motion detection unit 82 determines in step S43 that the motion subject has not been reflected, the processing proceeds to step S44. In step S44, the four-phase ranging operation unit 83 performs four-phase ranging operation processing as described above to calculate depth and confidence and supplies the calculated depth and the confidence to the ranging result storage unit 85 and the result synthesis unit 86 as ranging results. Then, the processing proceeds to step S46.

On the other hand, when the motion detection unit 82 determines in step S43 that the motion subject has been reflected, the processing proceeds to step S45. In step S45, the two-phase ranging operation unit 84 performs two-phase ranging operation processing as described above to calculate depth and confidence and supplies the calculated depth and the confidence to the ranging result storage unit 85 and the result synthesis unit 86 as ranging results. Then, the processing proceeds to step S46.

In steps S46 to S48, the same processing as that of steps S28 to S30 of FIG. 17 is performed. When it is determined in step S48 that the ranging is not to be continued, the ranging operation processing is ended.

As described above, the ranging operation processing unit 15B may switch between the four-phase ranging operation processing and the two-phase ranging operation processing according to a motion detection result to perform appropriate ranging with respect to a motion subject.

Note that the present technology is applicable to a system for modulating the amplitude of light emitted to an object called a Continuous-Wave system among Indirect ToF systems. Further, the structure of the photodiodes 31 of the light reception unit 14 is not limited to a depth sensor having a CAPD (Current Assisted Photonic Demodulator) structure but is applicable to a depth sensor having a structure that distributes charges to the two taps 32A and 32B.

(Configuration Example of Electronic Equipment)

The ranging module 11 as described above may be installed in electronic equipment such as, for example, a smart phone.

Figure 25:
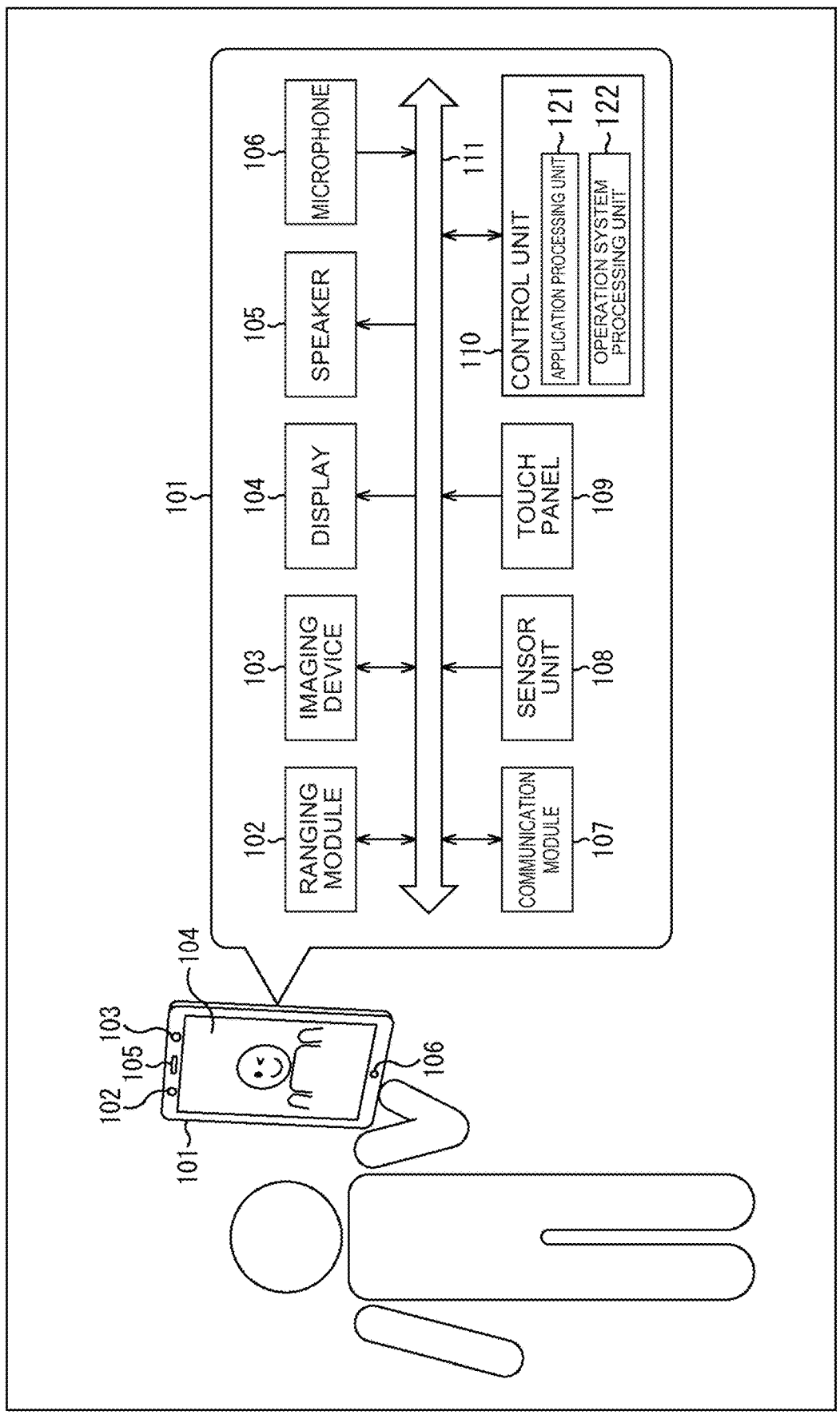
FIG. 25 is a block diagram showing a configuration example of electronic equipment in which a ranging module is installed.

FIG. 25 is a block diagram showing a configuration example of an imaging device installed in electronic equipment.

As shown in FIG. 25, electronic equipment 101 includes a ranging module 102, an imaging device 103, a display 104, a speaker 105, a microphone 106, a communication module 107, a sensor unit 108, a touch panel 109, and a control unit 110. Further, the control unit 110 has functions as the application processing unit 121 and the operation system processing unit 122 when a CPU runs a program.

The ranging module 11 of FIG. 1 is applied as the ranging module 102. For example, the ranging module 102 is arranged on the front surface of the electronic equipment 101 and may perform ranging targeted at a user of the electronic equipment 101 to output the depth of the surface shape of the face, the hand, the fingers, or the like of the user as a ranging result.

The imaging device 103 is arranged on the front surface of the electronic equipment 101 and performs imaging with the user of the electronic equipment 101 as a subject to acquire an image of the user. Note although not shown, the imaging device 103 may also be arranged on the back surface of the electronic equipment 101.

The display 104 displays an operation screen for performing processing by the application processing unit 121 and the operation system processing unit 122, an image captured by the imaging device 103, or the like. The speaker 105 and the microphone 106 output the voice of a party on the other side and collects the voice of the user when starting a call with the electronic equipment 101.

The communication module 107 performs communication via a communication network. The sensor unit 108 detects speed, acceleration, proximity, or the like, and the touch panel 109 acquires a touch operation by the user with respect to the operation screen displayed on the display 104.

The application processing unit 121 performs processing for providing various services by the electronic equipment 101. For example, the application processing unit 121 may perform processing for generating a face by computer graphics in which the facial expressions of the user are virtually reproduced on the basis of depth supplied from the ranging module 102 and displaying the generated face on the display 104. For example, the application processing unit 121 may perform processing for generating the 3D shape of any object on the basis of depth supplied from the ranging module 102.

The operation system processing unit 122 performs processing for realizing the basic functions and actions of the electronic equipment 101. For example, the operation system processing unit 122 may perform processing for identifying the face of the user on the basis of depth supplied from the ranging module 102 and unlocking the electronic equipment 101. Further, the operation system processing unit 122 may perform processing for recognizing the gesture of the user on the basis of depth supplied from the ranging module 102 and inputting various operations according to the gesture.

With the application of the above ranging module 11, the electronic equipment 101 thus configured may realize, for example, an improvement in frame rate, a reduction in power consumption, and narrowing of a data transfer band. Thus, the electronic equipment 101 is allowed to generate a face that moves more smoothly by computer graphics, identify a face with high accuracy, reduce the consumption of a battery, or transfer data with a narrow band.

(Configuration Example of Computer)

Next, the above series of processing may be performed not only by hardware but also by software. When the series of processing is performed by software, a program constituting the software is installed in a general-purpose computer or the like.

Figure 26:
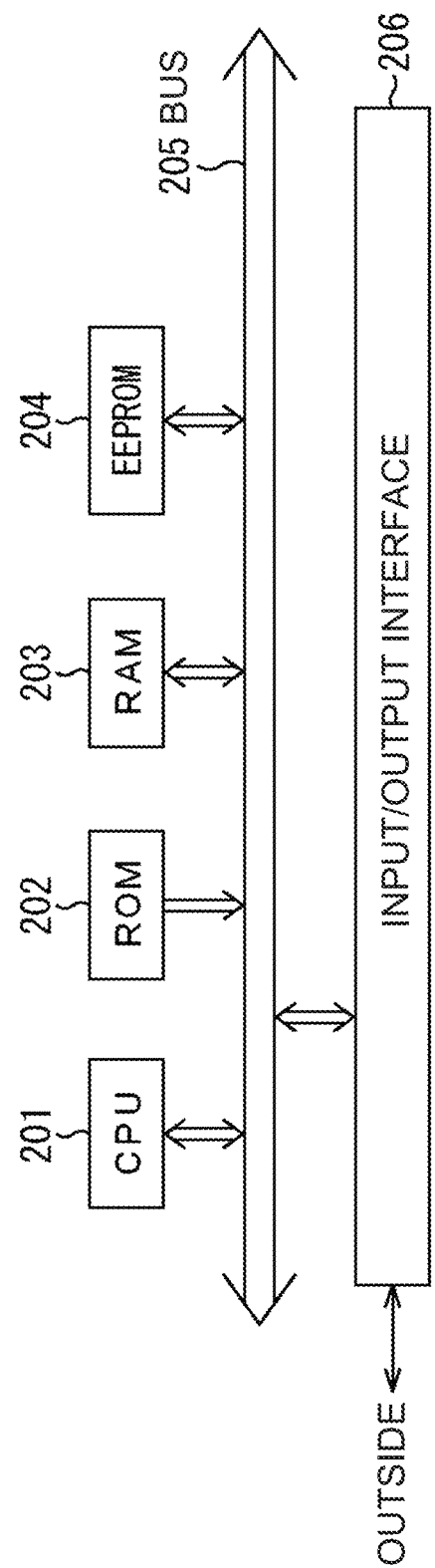
FIG. 26 is a block diagram showing a configuration example of an embodiment of a computer to which the present technology is applied.

FIG. 26 is a block diagram showing a configuration example of an embodiment of a computer in which a program for performing the above series of processing is installed.

In the computer, a CPU (Central Processing Unit) 201, a ROM (Read Only Memory) 202, a RAM (Random Access Memory) 203, and an EEPROM (Electronically Erasable and Programmable Read Only Memory) 204 are connected to each other via a bus 205. The bus 205 is also connected to an input/output interface 206, and the input/output interface 206 is connected to an outside.

In the computer configured as described above, the CPU 201 loads a program stored in the ROM 202 and the EEPROM 204 into the RAM 203 via the bus 205 to be performed. Thus, the above series of processing is performed. Further, the program to be performed by the computer (CPU 201) may be installed or updated in the EEPROM 205 from the outside via the input/output interface 206, besides being written in the ROM 202 in advance.

Thus, the CPU 201 performs the processing according to the above flowcharts or the processing performed according to the configurations of the above block diagrams. Then, the CPU 201 may output a result of the processing to the outside via, for example, the input/output interface 206 as occasion demands.

Here, in the present specification, the processing performed by the computer according to the program may not be necessarily chronologically performed along the orders described in the flowcharts. That is, the processing performed by the computer according to the program includes processing (for example, parallel processing or processing by an object) performed in parallel or separately.

Further, the program may be processed by one computer (processor) or may be subjected to dispersion processing by a plurality of computers. In addition, the program may be transferred to a distant computer to be performed.

In addition, a system in the present specification represents the aggregate of a plurality of constituents (such as apparatuses and modules (components)), and that all the constituents may not be necessarily accommodated in the same housing. Accordingly, both a plurality of apparatuses accommodated in separate housings and connected to each other via a network and one apparatus in which a plurality of modules are accommodated in one housing are systems.

Further, a configuration described above as one apparatus (or one processing unit) may be divided into and configured as a plurality of apparatuses (or a plurality of processing units). Conversely, a configuration described above as a plurality of apparatuses (or a plurality of processing units) may be collectively configured as one apparatus (or one processing unit). Further, configurations other than those described above may be, of course, added to the configurations of the respective apparatuses (or the respective processing units) described above. In addition, a part of the configurations of an apparatus (or a processing unit) may be included in the configurations of other apparatuses (or other processing units), provided that the entire system has substantially the same configurations or operations.

Further, for example, the present technology may employ the configuration of cloud computing in which one function is shared and cooperatively processed between a plurality of apparatuses via a network.

Further, for example, the above program can be performed in any apparatus. In this case, the apparatus may desirably have necessary functions (such as function blocks) and obtain necessary information.

Further, the respective steps described in the above flowcharts may be performed not only by one apparatus but also by a plurality of apparatuses in a shared fashion. In addition, when one step includes a plurality of processing, the plurality of processing included in the one step can be performed not only by one apparatus but also by a plurality of apparatuses in a shared fashion. In other words, a plurality of processing included in one step may be performed as the processing of a plurality of steps. Conversely, processing described as a plurality of steps may be collectively performed as one step.

Note that the program performed by the computer may be a program in which the processing of steps describing the program is chronologically performed in an order described in the present specification, or may be a program in which the processing of the steps is performed in parallel or separately performed at appropriate timing such as when invoked. That is, the processing of the respective steps may be performed in an order different from the order described above unless any contradiction arises. In addition, the processing of the steps describing the program may be performed in parallel with the processing of other programs, or may be performed in combination with the processing of other programs.

Note that the present technology described a plurality of times in the present specification may be performed alone unless any contradiction arises. Of course, any number of the plurality of present technologies may be performed in combination. For example, a part or all of the present technology described in any of the embodiments may be performed in combination with a part or all of the present technology described in other embodiments. Further, a part or all of the present technology described above may be performed in combination with other technologies not described above.

(Examples of Application to Mobile Bodies)

The technology (the present technology) according to an embodiment of the present disclosure may be applied to various products. For example, the technology according to the embodiment of the present disclosure may be realized as an apparatus installed in any type of movable body such as an automobile, an electric automobile, a hybrid electric automobile, a motorcycle, a bicycle, a personal mobility, an airplane, a drone, a ship, and a robot.

Figure 27:
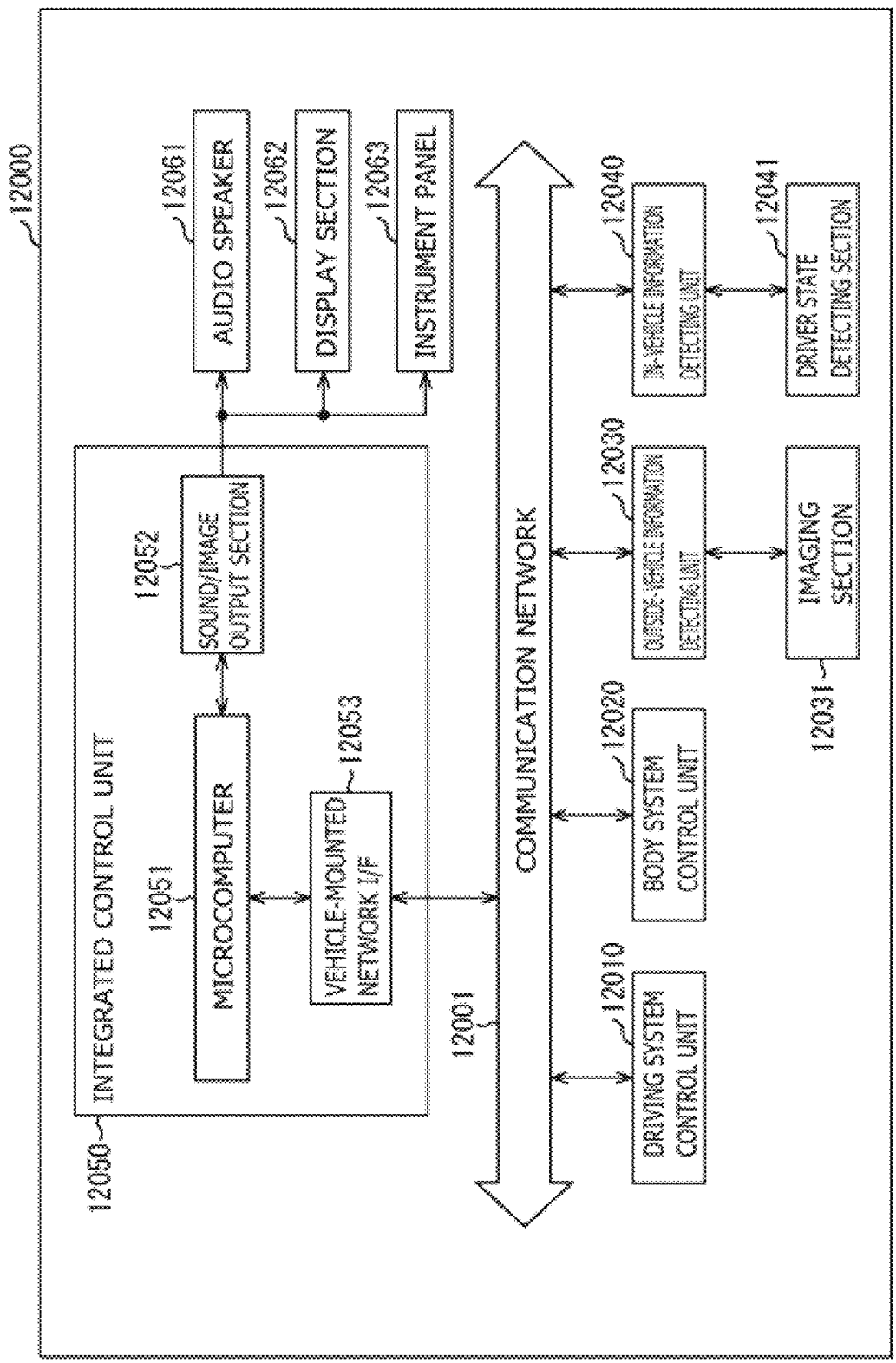
FIG. 27 is a block diagram depicting an example of schematic configuration of a vehicle control system.

FIG. 27 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 27, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehiclemounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automatic driving, which makes the vehicle to travel autonomously without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 27, an audio speaker 12061, a display section 12062, and an instrument panel 12063 are illustrated as the output device. The display section 12062 may, for example, include at least one of an on-board display and a head-up display.

Figure 28:
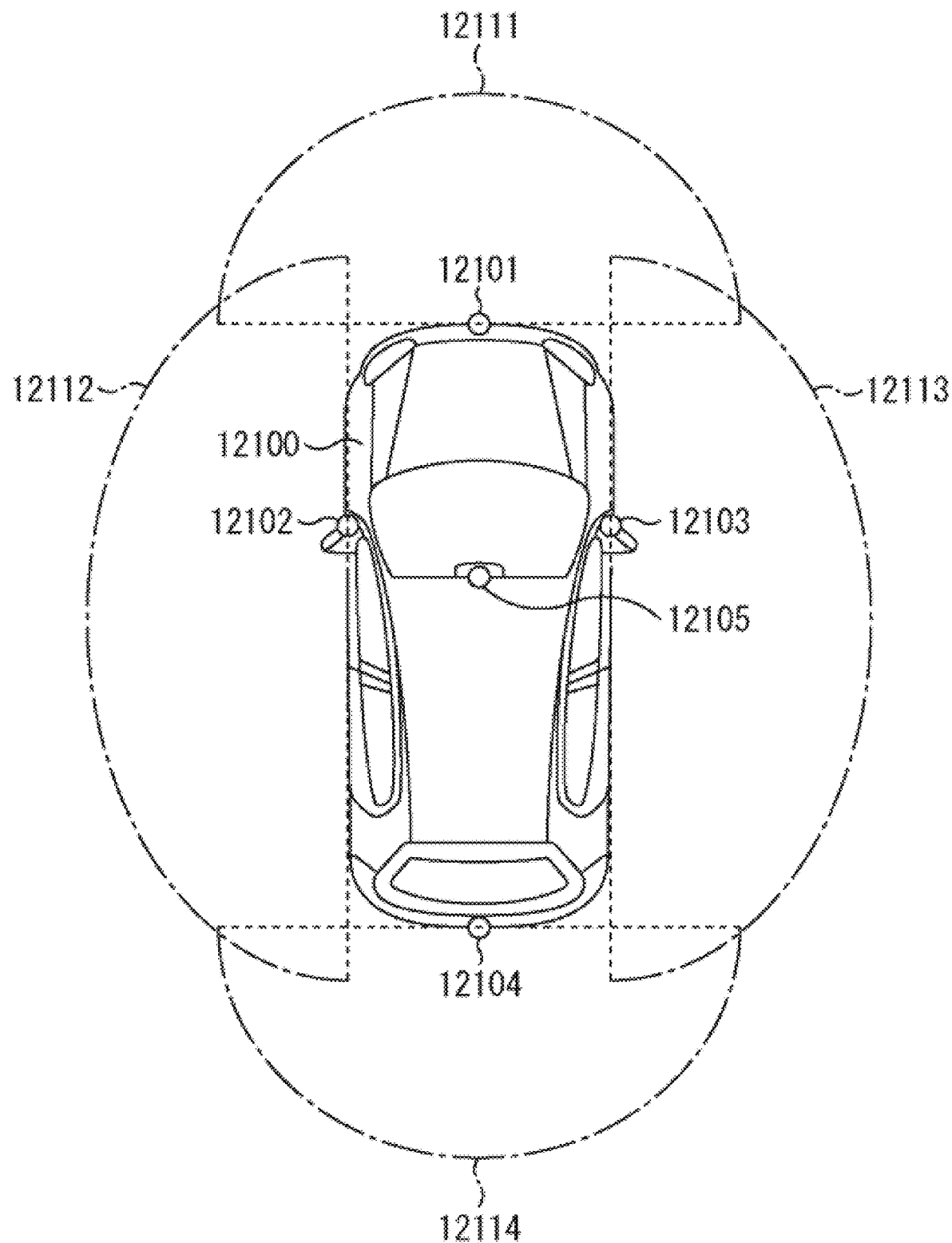
FIG. 28 is a diagram of assistance in explaining an example of installation positions of an outside-vehicle information detecting section and an imaging section.

FIG. 28 is a diagram depicting an example of the installation position of the imaging section 12031.

In FIG. 28, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 28 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automatic driving that makes the vehicle travel autonomously without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

Hereinabove, the example of the vehicle control system to which the technology according to an embodiment of the present disclosure can be applied has been described. The technology according to an embodiment of the present disclosure can be applied to the in-vehicle information detecting unit 12040 among the configurations that have been described above. Specifically, when the ranging by the ranging module 11 is used, it is possible to more accurately detect the state of a driver. Further, when the ranging by the ranging module 11 is used, processing for recognizing the gesture of the driver may be performed to perform various operations according to the gesture.

(Combination Example of Configurations)

Note that the present technology may employ the following configurations.

(1) A ranging processing device, including:

a four-phase ranging operation unit configured to perform, when charges generated by irradiating irradiated light of first to fourth phases onto an object and receiving reflected light reflected by the object are distributed to a first tap and a second tap according to a distance to the object, an operation to calculate depth indicating the distance to the object by using all eight detection signals two of which are detected for each of the irradiated light of the first to fourth phases;

a two-phase ranging operation unit configured to perform the operation to calculate the depth indicating the distance to the object by alternately using four detection signals based on the irradiated light of the first phase and the irradiated light of the second phase and four detection signals based on the irradiated light of the third phase and the irradiated light of the fourth phase among the eight detection signals; and a condition determination unit configured to make condition determination based on the detection signals and switch between the four-phase ranging operation unit and the two-phase ranging operation unit to be used.

(2) The ranging processing device according to (1), wherein the charges are configured to be alternately distributed to the first tap and the second tap a plurality of times, and a first detection signal corresponding to the charges distributed to and accumulated in the first tap and a second detection signal corresponding to the charges distributed to and accumulated in the second tap are detected in a first detection period in which the reflected light generated from the irradiated light of the first phase is received, the charges are configured to be alternately distributed to the first tap and the second tap a plurality of times, and a third detection signal corresponding to the charges distributed to and accumulated in the first tap and a fourth detection signal corresponding to the charges distributed to and accumulated in the second tap are detected in a second detection period in which the reflected light generated from the irradiated light of the second phase is received, the charges are configured to be alternately distributed to the first tap and the second tap a plurality of times, and a fifth detection signal corresponding to the charges distributed to and accumulated in the first tap and a sixth detection signal corresponding to the charges distributed to and accumulated in the second tap are detected in a third detection period in which the reflected light generated from the irradiated light of the third phase is received, and the charges are configured to be alternately distributed to the first tap and the second tap a plurality of times, and a seventh detection signal corresponding to the charges distributed to and accumulated in the first tap and an eighth detection signal corresponding to the charges distributed to and accumulated in the second tap are detected in a fourth detection period in which the reflected light generated from the irradiated light of the fourth phase is received.

(3) The ranging processing device according to (2), wherein the four-phase ranging operation unit is configured to cancel influence due to a difference in characteristics between the first tap and the second tap to calculate the depth by using a difference between the first detection signal and the second detection signal, a difference between the third detection signal and the fourth detection signal, a difference between the fifth detection signal and the sixth detection signal, and a difference between the seventh detection signal and the eighth detection signal.

(4) The ranging processing device according to (3), wherein the two-phase ranging operation unit is configured to alternately perform calculating the depth on a basis of the first to fourth detection signals and a correction parameter after calculating the correction parameter for correcting the difference in the characteristics between the first tap and the second tap by using the first to fourth detection signals, and calculating the depth on a basis of the fifth and sixth detection signals and a correction parameter after calculating the correction parameter for correcting the difference in the characteristics between the first tap and the second tap by using the fifth to eighth detection signals.

(5) The ranging processing device according to any of (1) to (4), further including:

a measurement result storage unit configured to store the depth calculated by one of the four-phase ranging operation unit and the two-phase ranging operation unit; and a result synthesis unit configured to synthesize the depth of a previous frame stored in the measurement result storage unit and the depth of a current frame together to be output.

(6) The ranging processing device according to (5), wherein the four-phase ranging operation unit and the two-phase ranging operation unit are configured to calculate confidence with respect to the depth together with the depth, the measurement result storage unit is configured to store the confidence together with the depth, and the result synthesis unit is configured to perform weighting addition corresponding to the confidence to synthesize the depth of the previous frame and the depth of the current frame together.

(7) The ranging processing device according to (5) or (6), wherein the result synthesis unit is configured to synthesize the depth of the previous frame calculated by using all the eight detection signals by the four-phase ranging operation unit and the depth of the current frame calculated by using all the eight detection signals by the four-phase ranging operation unit together.

(8) The ranging processing device according to (5) or (6), wherein, among the depth calculated by using the four detection signals based on the irradiated light of the first phase and the irradiated light of the second phase by the two-phase ranging operation unit and the depth calculated by using the four detection signals based on the irradiated light of the third phase and the irradiated light of the fourth phase by the two-phase ranging operation unit, the result synthesis unit is configured to recognize one depth as the depth of the previous frame and the other depth as the depth of the current frame and synthesize the same together.

(9) The ranging processing device according to any of (1) to (8), wherein the condition determination unit is configured to perform the condition determination for each of pixels of a light reception unit that receives the reflected light and switch the operation to calculate the depth by the four-phase ranging operation unit and the two-phase ranging operation unit for each of the pixels.

(10) The ranging processing device according to any of (1) to (9), wherein the condition determination unit is configured to make the condition determination on a basis of motion of the object detected by comparing the four detection signals based on the irradiated light of the first phase and the irradiated light of the second phase with the four detection signals based on the irradiated light of the third phase and the irradiated light of the fourth phase, perform the operation to calculate the depth by the two-phase ranging operation unit when the object is detected to be in motion, and perform the operation to calculate the depth by the four-phase ranging operation unit when the object is not detected to be in motion.

(11) The ranging processing device according to any of (1) to (9), wherein the condition determination unit is configured to make the condition determination on a basis of brightness calculated from the four detection signals based on the irradiated light of the first phase and the irradiated light of the second phase and brightness calculated from the four detection signals based on the irradiated light of the third phase and the irradiated light of the fourth phase, and switch between the four-phase ranging operation unit and the two-phase ranging operation unit according to the brightness.

(12) The ranging processing device according to any of (1) to (9), wherein the four-phase ranging operation unit and the two-phase ranging operation unit are configured to calculate confidence with respect to the depth together with the depth, and the condition determination unit is configured to make the condition determination on a basis of the confidence calculated in a previous frame and switch between the four-phase ranging operation unit and the two-phase ranging operation unit according to the confidence.

(13) The ranging processing device according to (1) to (12), wherein the first detection period, the second detection period, the third detection period, and the fourth detection period are set at substantially uniform intervals.

(14) A ranging module, including:

a light emission unit configured to irradiate irradiated light of first to fourth phases onto an object;

a light reception unit configured to output, when charges generated by receiving reflected light reflected by the object are distributed to a first tap and a second tap according to a distance to the object, eight detection signals two of which are detected for each of the irradiated light of the first to fourth phases;

a four-phase ranging operation unit configured to perform an operation to calculate depth indicating the distance to the object by using all the eight detection signals;

a two-phase ranging operation unit configured to perform an operation to calculate the depth indicating the distance to the object by alternately using four detection signals based on the irradiated light of the first phase and the irradiated light of the second phase and four detection signals based on the irradiated light of the third phase and the irradiated light of the fourth phase among the eight detection signals; and a condition determination unit configured to make condition determination based on the detection signals and switch between the four-phase ranging operation unit and the two-phase ranging operation unit.

(15) A ranging processing method, including:

performing four-phase ranging operation processing for performing, when charges generated by irradiating irradiated light of first to fourth phases onto an object and receiving reflected light reflected by the object are distributed to a first tap and a second tap according to a distance to the object, an operation to calculate depth indicating the distance to the object by using all eight detection signals two of which are detected for each of the irradiated light of the first to fourth phases;

performing two-phase ranging operation processing for performing the operation to calculate the depth indicating the distance to the object by alternately using four detection signals based on the irradiated light of the first phase and the irradiated light of the second phase and four detection signals based on the irradiated light of the third phase and the irradiated light of the fourth phase among the eight detection signals; and making condition determination based on the detection signals and switching between the four-phase ranging operation processing and the two-phase ranging operation processing to be used.

(16) A program for causing a computer of a ranging processing device that performs ranging processing to perform the ranging processing, the ranging processing including:

performing four-phase ranging operation processing for performing, when charges generated by irradiating irradiated light of first to fourth phases onto an object and receiving reflected light reflected by the object are distributed to a first tap and a second tap according to a distance to the object, an operation to calculate depth indicating the distance to the object by using all eight detection signals two of which are detected for each of the irradiated light of the first to fourth phases;

performing two-phase ranging operation processing for performing the operation to calculate the depth indicating the distance to the object by alternately using four detection signals based on the irradiated light of the first phase and the irradiated light of the second phase and four detection signals based on the irradiated light of the third phase and the irradiated light of the fourth phase among the eight detection signals; and making condition determination based on the detection signals and switching between the four-phase ranging operation processing and the two-phase ranging operation processing to be used.

Note that the present embodiments are not limited to those described above but may be modified in various ways without departing from the spirit of the present disclosure. Further, the effects described in the present specification are given only for illustration and are not limitative. Other effects may be produced.

It should be understood by those skilled in the art that various modifications, combinations, sub-combinations and alterations may occur depending on design requirements and other factors insofar as they are within the scope of the appended claims or the equivalents thereof.

What is claimed is:

1. A ranging processing device, comprising:

a four-phase ranging operation unit configured to perform, when charges generated by irradiating irradiated light of first, second, third, and fourth phases onto an object and receiving reflected light reflected by the object are distributed to a first tap and a second tap according to a distance from the ranging processing device to the object, an operation to calculate a depth indicating the distance from the ranging processing device to the object by using eight detection signals, two of which are detected for each of the irradiated light of the first, second, third, and fourth phases;

a two-phase ranging operation unit configured to perform the operation to calculate the depth indicating the distance from the ranging processing device to the object by alternately using four detection signals based on the irradiated light of the first phase and the irradiated light of the second phase and four detection signals based on the irradiated light of the third phase and the irradiated light of the fourth phase among the eight detection signals; and a condition determination unit configured to make a condition determination based on the eight detection signals and switch between using the four-phase ranging operation unit and the two-phase ranging operation unit.

2. The ranging processing device according to claim 1, wherein the charges are configured to be alternately distributed to the first tap and the second tap a plurality of times, and a first detection signal corresponding to the charges distributed to and accumulated in the first tap and a second detection signal corresponding to the charges distributed to and accumulated in the second tap are detected in a first detection period in which the reflected light generated from the irradiated light of the first phase is received, the charges are configured to be alternately distributed to the first tap and the second tap a plurality of times, and a third detection signal corresponding to the charges distributed to and accumulated in the first tap and a fourth detection signal corresponding to the charges distributed to and accumulated in the second tap are detected in a second detection period in which the reflected light generated from the irradiated light of the second phase is received, the charges are configured to be alternately distributed to the first tap and the second tap a plurality of times, and a fifth detection signal corresponding to the charges distributed to and accumulated in the first tap and a sixth detection signal corresponding to the charges distributed to and accumulated in the second tap are detected in a third detection period in which the reflected light generated from the irradiated light of the third phase is received, and the charges are configured to be alternately distributed to the first tap and the second tap a plurality of times, and a seventh detection signal corresponding to the charges distributed to and accumulated in the first tap and an eighth detection signal corresponding to the charges distributed to and accumulated in the second tap are detected in a fourth detection period in which the reflected light generated from the irradiated light of the fourth phase is received.

3. The ranging processing device according to claim 2, wherein
the four-phase ranging operation unit is configured to cancel influence due to a difference in characteristics between the first tap and the second tap to calculate the depth by using a difference between the first detection signal and the second detection signal, a difference between the third detection signal and the fourth detection signal, a difference between the fifth detection signal and the sixth detection signal, and a difference between the seventh detection signal and the eighth detection signal.

4. The ranging processing device according to claim 2, wherein
the two-phase ranging operation unit is configured to alternately perform
calculating the depth on a basis of the first to fourth detection signals and a correction parameter after calculating the correction parameter for correcting a difference in a characteristics between the first tap and the second tap by using the first to fourth detection signals, and
calculating the depth on a basis of the fifth and sixth detection signals and a correction parameter after calculating the correction parameter for correcting the difference in the characteristics between the first tap and the second tap by using the fifth to eighth detection signals.

5. The ranging processing device according to claim 1, further comprising:
a measurement result storage unit configured to store the depth calculated by one of the four-phase ranging operation unit and the two-phase ranging operation unit; and
a result synthesis unit configured to synthesize the depth of a previous frame stored in the measurement result storage unit and the depth of a current frame together to be output.

6. The ranging processing device according to claim 5, wherein
the four-phase ranging operation unit and the two-phase ranging operation unit are configured to calculate confidence with respect to the depth together with the depth,
the measurement result storage unit is configured to store the confidence together with the depth, and
the result synthesis unit is configured to perform weighting addition corresponding to the confidence to synthesize the depth of the previous frame and the depth of the current frame together.

7. The ranging processing device according to claim 5, wherein
the result synthesis unit is configured to synthesize the depth of the previous frame calculated by using all the eight detection signals by the four-phase ranging operation unit and the depth of the current frame calculated by using all the eight detection signals by the four-phase ranging operation unit together.

8. The ranging processing device according to claim 5, wherein,
among the depth calculated by using the four detection signals based on the irradiated light of the first phase and the irradiated light of the second phase by the two-phase ranging operation unit and the depth calculated by using the four detection signals based on the irradiated light of the third phase and the irradiated light of the fourth phase by the two-phase ranging operation unit, the result synthesis unit is configured to recognize one depth as the depth of the previous frame and the other depth as the depth of the current frame and synthesize the depth of the previous frame and the depth of the current frame together.

9. The ranging processing device according to claim 1, wherein
the condition determination unit is configured to perform the condition determination for each of pixels of a light reception unit that receives the reflected light and switch the operation to calculate the depth by the four-phase ranging operation unit and the two-phase ranging operation unit for each of the pixels.

10. The ranging processing device according to claim 1, wherein
the condition determination unit is configured to
make the condition determination on a basis of motion of the object detected by comparing the four detection signals based on the irradiated light of the first phase and the irradiated light of the second phase with the four detection signals based on the irradiated light of the third phase and the irradiated light of the fourth phase,
perform the operation to calculate the depth by the two-phase ranging operation unit when the object is detected to be in motion, and
perform the operation to calculate the depth by the four-phase ranging operation unit when the object is not detected to be in motion.

11. The ranging processing device according to claim 1, wherein
the condition determination unit is configured to
make the condition determination on a basis of brightness calculated from the four detection signals based on the irradiated light of the first phase and the irradiated light of the second phase and brightness calculated from the four detection signals based on the irradiated light of the third phase and the irradiated light of the fourth phase, and
switch between the four-phase ranging operation unit and the two-phase ranging operation unit according to the brightness.

12. The ranging processing device according to claim 1, wherein
the four-phase ranging operation unit and the two-phase ranging operation unit are configured to calculate confidence with respect to the depth together with the depth, and
the condition determination unit is configured to make the condition determination on a basis of the confidence calculated in a previous frame and switch between the four-phase ranging operation unit and the two-phase ranging operation unit according to the confidence.

13. The ranging processing device according to claim 2, wherein
the first detection period, the second detection period, the third detection period, and the fourth detection period are set at substantially uniform intervals.

14. A ranging module, comprising:
a light emission unit configured to irradiate irradiated light of first, second, third, and fourth phases onto an object;
a light reception unit configured to output, when charges generated by receiving reflected light reflected by the object are distributed to a first tap and a second tap according to a distance to the object from the ranging module, eight detection signals, two of which are detected for each of the irradiated light of the first, second, third, and fourth phases;

a four-phase ranging operation unit configured to perform an operation to calculate depth indicating the distance to the object from the ranging module by using all the eight detection signals;

a two-phase ranging operation unit configured to perform an operation to calculate the depth indicating the distance to the object by alternately using four detection signals based on the irradiated light of the first phase and the irradiated light of the second phase and four detection signals based on the irradiated light of the third phase and the irradiated light of the fourth phase among the eight detection signals; and a condition determination unit configured to make a condition determination based on the eight detection signals and to switch between the four-phase ranging operation unit and the two-phase ranging operation unit.

15. A ranging processing method, comprising:

performing four-phase ranging operation processing for performing, when charges generated by irradiating irradiated light of first, second, third, and fourth phases onto an object and receiving reflected light reflected by the object are distributed to a first tap and a second tap according to a distance to the object, an operation to calculate depth indicating the distance to the object by using eight detection signals, two of which are detected for each of the irradiated light of the first, second, third, and fourth phases;

performing two-phase ranging operation processing for performing the operation to calculate the depth indicating the distance to the object by alternately using four detection signals based on the irradiated light of the first phase and the irradiated light of the second phase and four detection signals based on the irradiated light of the third phase and the irradiated light of the fourth phase among the eight detection signals; and making a condition determination based on the eight detection signals and switching between the four-phase ranging operation processing and the two-phase ranging operation processing.

16. A non-transitory computer readable medium comprising program instructions for causing a computer of a ranging processing device that performs ranging processing to perform a method of ranging processing, the method comprising:

performing four-phase ranging operation processing for performing, when charges generated by irradiating irradiated light of first, second, third, and fourth phases onto an object and receiving reflected light reflected by the object are distributed to a first tap and a second tap according to a distance to the object from the ranging processing device, an operation to calculate depth indicating the distance to the object from the ranging processing device by using eight detection signals, two of which are detected for each of the irradiated light of the first, second, third, and fourth phases;

performing two-phase ranging operation processing for performing an operation to calculate the depth indicating the distance to the object from the ranging processing device by alternately using four detection signals based on the irradiated light of the first phase and the irradiated light of the second phase and four detection signals based on the irradiated light of the third phase and the irradiated light of the fourth phase among the eight detection signals; and making a condition determination based on the eight detection signals and switching between the four-phase ranging operation processing and the two-phase ranging operation processing.

* * * * *